US007464050B1

(12) United States Patent
Deaton et al.

(10) Patent No.: US 7,464,050 B1
(45) Date of Patent: Dec. 9, 2008

(54) METHOD AND SYSTEM FOR FACILITATING CONSUMER PURCHASES

(75) Inventors: David W. Deaton, Abilene, TX (US); Rodney G. Gabriel, Abilene, TX (US)

(73) Assignee: Incentech, Inc., Abilene, TX (US)

( * ) Notice: Subject to any disclaimer, the term of this patent is extended or adjusted under 35 U.S.C. 154(b) by 643 days.

(21) Appl. No.: 10/609,331

(22) Filed: Jun. 26, 2003

Related U.S. Application Data

(63) Continuation of application No. 09/372,412, filed on Aug. 11, 1999, now abandoned, which is a continuation-in-part of application No. 09/354,263, filed on Jul. 15, 1999, now abandoned.

(51) Int. Cl.
*G06Q 30/00* (2006.01)
*G07G 1/14* (2006.01)

(52) U.S. Cl. .......................................... 705/26; 705/14

(58) Field of Classification Search .................. 705/14, 705/26, 27
See application file for complete search history.

(56) References Cited

U.S. PATENT DOCUMENTS

| 2,995,727 | A | 8/1961 | Quade |
| 3,316,536 | A | 4/1967 | Andrews et al. |
| 3,465,289 | A | 9/1969 | Klein |
| 3,528,058 | A | 9/1970 | Bond |
| 3,535,682 | A | 10/1970 | Dykaar et al. |
| 3,576,539 | A | 4/1971 | Huber |
| 3,605,092 | A | 9/1971 | Richard |
| 3,629,829 | A | 12/1971 | Ordower |
| 3,657,702 | A | 4/1972 | Stephenson, Jr. |
| 3,697,693 | A | 10/1972 | Deschenes et al. |
| 3,719,927 | A | 3/1973 | Michels et al. |
| 3,786,421 | A | 1/1974 | Wostl et al. |
| 3,792,437 | A | 2/1974 | Blumenthal et al. |
| 3,833,885 | A | 9/1974 | Gentile et al. |
| 3,876,981 | A | 4/1975 | Welch |
| 3,914,789 | A | 10/1975 | Coker, Jr. et al. |

(Continued)

FOREIGN PATENT DOCUMENTS

EP 0 511 463 A2 11/1992

(Continued)

OTHER PUBLICATIONS

Author unknown, "Shoppers Can Save Time and Money, Find Holiday Gift Suggestions," PR Newswire, Nov. 30, 1996, p. 0988.*

(Continued)

*Primary Examiner*—Jeffrey A. Smith
*Assistant Examiner*—Amee A Shah
(74) *Attorney, Agent, or Firm*—Sterne, Kessler, Goldstein & Fox P.L.L.C.

(57) ABSTRACT

A method for use in marketing includes detecting, at a remote computer, product purchase information of a plurality of retail stores. The product purchase information includes price information. The remote computer is located remote from the retail store. The method also includes receiving, at the remote computer, a shopping list of a customer. The shopping list includes at least one item. In response to receiving the shopping list, communication to the customer of price information associated with at least one item on the shopping list for the plurality of retail stores is initiated by the remote computer.

22 Claims, 7 Drawing Sheets

U.S. PATENT DOCUMENTS

| | | |
|---|---|---|
| 3,941,977 A | 3/1976 | Voss et al. |
| 3,949,363 A | 4/1976 | Holm |
| 3,959,624 A | 5/1976 | Kaslow |
| 3,987,411 A | 10/1976 | Kruklitis et al. |
| 4,002,886 A | 1/1977 | Sundelin |
| 4,015,701 A | 4/1977 | Templeton |
| 4,017,835 A | 4/1977 | Randolph |
| 4,027,142 A | 5/1977 | Paup et al. |
| 4,053,735 A | 10/1977 | Foudos |
| 4,053,737 A | 10/1977 | Lafevers et al. |
| 4,063,070 A | 12/1977 | Delarue et al. |
| 4,087,789 A | 5/1978 | Beery |
| 4,088,879 A | 5/1978 | Banka et al. |
| 4,091,448 A | 5/1978 | Clausing |
| 4,107,653 A | 8/1978 | Kruklitis |
| 4,109,238 A | 8/1978 | Creekmore |
| 4,114,027 A | 9/1978 | Slater et al. |
| 4,124,109 A | 11/1978 | Bissell et al. |
| 4,127,770 A | 11/1978 | Baader |
| 4,142,235 A | 2/1979 | Tadakuma et al. |
| 4,143,355 A | 3/1979 | MacIntyre |
| 4,143,356 A | 3/1979 | Nally |
| 4,148,010 A | 4/1979 | Shiau |
| 4,176,783 A | 12/1979 | Eppich |
| 4,201,978 A | 5/1980 | Nally |
| 4,208,575 A | 6/1980 | Haltof |
| 4,245,211 A | 1/1981 | Kao |
| RE30,579 E | 4/1981 | Goldman et al. |
| RE30,580 E | 4/1981 | Goldman et al. |
| 4,260,880 A | 4/1981 | Thomas |
| 4,277,689 A | 7/1981 | Thomas et al. |
| RE30,821 E | 12/1981 | Goldman |
| 4,325,117 A | 4/1982 | Parmet et al. |
| 4,332,325 A | 6/1982 | Manizza |
| 4,356,472 A | 10/1982 | Hau-Chun Ku et al. |
| 4,380,734 A | 4/1983 | Allerton |
| 4,381,494 A | 4/1983 | Wisner |
| 4,396,902 A | 8/1983 | Warthan et al. |
| 4,399,553 A | 8/1983 | Toyama |
| 4,404,649 A | 9/1983 | Nunley et al. |
| 4,425,626 A | 1/1984 | Parmet et al. |
| 4,439,670 A | 3/1984 | Basset et al. |
| 4,441,204 A | 4/1984 | Hanna |
| 4,453,074 A | 6/1984 | Weinstein |
| 4,485,300 A | 11/1984 | Peirce |
| 4,510,615 A | 4/1985 | Rohrer |
| 4,523,330 A | 6/1985 | Cain |
| 4,547,780 A | 10/1985 | Cummins |
| 4,547,899 A | 10/1985 | Nally et al. |
| 4,554,446 A | 11/1985 | Murphy et al. |
| 4,595,997 A | 6/1986 | Parmet et al. |
| 4,617,457 A | 10/1986 | Granzow et al. |
| 4,628,194 A | 12/1986 | White |
| 4,630,201 A | 12/1986 | White |
| 4,670,853 A | 6/1987 | Stepien |
| 4,672,377 A | 6/1987 | Murphy et al. |
| 4,672,572 A | 6/1987 | Alsberg |
| 4,673,802 A | 6/1987 | Ohmae et al. |
| 4,674,041 A | 6/1987 | Lemon et al. |
| 4,676,343 A | 6/1987 | Humble et al. |
| 4,678,895 A | 7/1987 | Tateisi et al. |
| 4,703,423 A | 10/1987 | Bado et al. |
| 4,722,054 A | 1/1988 | Yorozu et al. |
| 4,723,212 A | 2/1988 | Mindrum et al. |
| 4,727,243 A | 2/1988 | Savar |
| 4,745,468 A | 5/1988 | Von Kohorn |
| 4,745,468 A | 5/1988 | Von Kohorn |
| 4,748,668 A | 5/1988 | Shamir et al. |
| 4,748,673 A | 5/1988 | Barre et al. |
| 4,750,119 A | 6/1988 | Cohen et al. |
| 4,776,021 A | 10/1988 | Ho |
| 4,791,281 A | 12/1988 | Johnsen et al. |
| 4,797,938 A | 1/1989 | Will |
| 4,799,156 A | 1/1989 | Shavit et al. |
| 4,809,351 A | 2/1989 | Abramovitz et al. |
| 4,810,866 A | 3/1989 | Lord, Jr. |
| 4,812,628 A | 3/1989 | Boston et al. |
| 4,821,186 A | 4/1989 | Munakata et al. |
| 4,825,045 A | 4/1989 | Humble |
| 4,833,308 A | 5/1989 | Humble |
| 4,872,113 A | 10/1989 | Dinerstein |
| 4,876,592 A | 10/1989 | Von Kohorn |
| 4,882,675 A | 11/1989 | Nichtberger et al. |
| 4,885,685 A | 12/1989 | Wolfberg et al. |
| 4,887,207 A | 12/1989 | Natarajan |
| 4,891,503 A | 1/1990 | Jewell |
| 4,897,880 A | 1/1990 | Wilber et al. |
| 4,908,761 A | 3/1990 | Tai |
| 4,910,672 A | 3/1990 | Off et al. |
| 4,926,255 A | 5/1990 | Von Kohorn |
| 4,933,536 A | 6/1990 | Lindemann et al. |
| 4,941,090 A | 7/1990 | McCarthy |
| 4,947,321 A | 8/1990 | Spence et al. |
| 4,949,256 A | 8/1990 | Humble |
| 4,972,504 A | 11/1990 | Daniel, Jr. et al. |
| 4,975,841 A | 12/1990 | Kehnemuyi et al. |
| 4,982,346 A | 1/1991 | Girouard et al. |
| 4,993,068 A | 2/1991 | Piosenka et al. |
| 5,008,518 A | 4/1991 | Taussig et al. |
| 5,010,485 A | 4/1991 | Bigari |
| 5,014,324 A | 5/1991 | Mazumder |
| 5,025,372 A | 6/1991 | Burton et al. |
| 5,034,807 A | 7/1991 | Von Kohorn |
| 5,040,226 A | 8/1991 | Elischer et al. |
| 5,053,607 A | 10/1991 | Carlson et al. |
| 5,053,955 A | 10/1991 | Peach et al. |
| 5,054,092 A | 10/1991 | LaCaze |
| 5,056,019 A | 10/1991 | Schultz et al. |
| 5,057,915 A | 10/1991 | Von Kohorn |
| 5,070,452 A | 12/1991 | Doyle, Jr. et al. |
| 5,077,805 A | 12/1991 | Tan |
| 5,091,634 A | 2/1992 | Finch et al. |
| 5,095,195 A | 3/1992 | Harman et al. |
| 5,117,355 A | 5/1992 | McCarthy |
| 5,128,520 A | 7/1992 | Rando et al. |
| 5,128,752 A | 7/1992 | Von Kohorn |
| 5,172,314 A | 12/1992 | Poland et al. |
| 5,173,851 A | 12/1992 | Off et al. |
| 5,179,375 A | 1/1993 | Dick et al. |
| 5,185,695 A | 2/1993 | Pruchnicki |
| 5,201,010 A | 4/1993 | Deaton et al. |
| 5,202,826 A | 4/1993 | McCarthy |
| 5,227,874 A | 7/1993 | Von Kohorn |
| 5,235,345 A | 8/1993 | Ohno et al. |
| 5,237,496 A | 8/1993 | Kagami et al. |
| 5,237,620 A | 8/1993 | Deaton et al. |
| 5,245,164 A | 9/1993 | Oyama |
| 5,245,533 A | 9/1993 | Marshall |
| 5,249,044 A | 9/1993 | Von Kohorn |
| 5,251,152 A | 10/1993 | Notess |
| 5,253,345 A | 10/1993 | Fernandes et al. |
| 5,256,863 A | 10/1993 | Ferguson et al. |
| 5,283,734 A | 2/1994 | Von Kohorn |
| 5,305,196 A | 4/1994 | Deaton et al. |
| 5,310,997 A | 5/1994 | Roach et al. |
| 5,327,508 A | 7/1994 | Deaton et al. |
| 5,337,253 A | 8/1994 | Berkovsky et al. |
| 5,353,218 A | 10/1994 | De Lapa et al. |
| 5,368,129 A | 11/1994 | Von Kohorn |
| 5,388,165 A | 2/1995 | Deaton et al. |
| RE34,915 E | 4/1995 | Nichtberger et al. |
| 5,430,644 A | 7/1995 | Deaton et al. |
| 5,448,471 A | 9/1995 | Deaton et al. |
| 5,459,306 A | 10/1995 | Stein et al. |

| | | | | | | |
|---|---|---|---|---|---|---|
| 5,483,049 | A | 1/1996 | Schulze, Jr. | 6,070,147 A * | 5/2000 | Harms et al. .................. 705/14 |
| 5,493,107 | A | 2/1996 | Gupta et al. | 6,076,068 A | 6/2000 | De Lapa et al. |
| 5,508,731 | A | 4/1996 | Von Kohorn | 6,076,070 A * | 6/2000 | Stack .......................... 705/20 |
| 5,515,098 | A | 5/1996 | Carles | 6,102,969 A * | 8/2000 | Christianson et al. ....... 717/146 |
| 5,537,314 | A | 7/1996 | Kanter | 6,129,274 A | 10/2000 | Suzuki |
| 5,592,560 | A | 1/1997 | Deaton et al. | 6,138,911 A | 10/2000 | Fredregill et al. |
| 5,604,788 | A | 2/1997 | Tett | 6,141,010 A | 10/2000 | Hoyle |
| 5,612,527 | A | 3/1997 | Ovadia | 6,142,371 A | 11/2000 | Oneda |
| 5,612,868 | A | 3/1997 | Off et al. | 6,154,738 A | 11/2000 | Call |
| 5,621,812 | A | 4/1997 | Deaton et al. | 6,185,541 B1 | 2/2001 | Scroggie et al. |
| 5,632,010 | A | 5/1997 | Briechle et al. | 6,216,129 B1 | 4/2001 | Eldering |
| 5,638,457 | A | 6/1997 | Deaton et al. | 6,236,985 B1 | 5/2001 | Aggarwal et al. |
| 5,642,484 | A | 6/1997 | Harrison, III et al. | 6,246,997 B1 | 6/2001 | Cybul et al. |
| 5,642,485 | A | 6/1997 | Deaton et al. | 6,249,772 B1 | 6/2001 | Walker et al. |
| 5,644,723 | A | 7/1997 | Deaton et al. | 6,260,024 B1 | 7/2001 | Shkedy |
| 5,649,114 | A | 7/1997 | Deaton et al. | 6,278,979 B1 * | 8/2001 | Williams ..................... 705/14 |
| 5,659,469 | A | 8/1997 | Deaton et al. | 6,292,786 B1 | 9/2001 | Deaton et al. |
| 5,675,662 | A | 10/1997 | Deaton et al. | 6,314,406 B1 | 11/2001 | O'Hagan et al. |
| 5,687,322 | A | 11/1997 | Deaton et al. | 6,317,722 B1 | 11/2001 | Jacobi et al. |
| 5,697,844 | A | 12/1997 | Von Kohorn | 6,321,210 B1 | 11/2001 | O'Brien et al. |
| 5,708,782 | A | 1/1998 | Larson et al. | 6,321,984 B1 | 11/2001 | McCall et al. |
| 5,710,886 | A | 1/1998 | Christensen et al. | 6,330,543 B1 | 12/2001 | Kepecs |
| 5,712,989 | A | 1/1998 | Johnson et al. | 6,332,128 B1 | 12/2001 | Nicholson |
| 5,713,795 | A | 2/1998 | Von Kohorn | 6,334,108 B1 | 12/2001 | Deaton et al. |
| 5,717,866 | A | 2/1998 | Naftzger | 6,336,099 B1 | 1/2002 | Barnett et al. |
| 5,719,382 | A | 2/1998 | White | 6,351,735 B1 | 2/2002 | Deaton et al. |
| 5,727,153 | A | 3/1998 | Powell | 6,424,949 B1 | 7/2002 | Deaton et al. |
| 5,740,549 | A | 4/1998 | Reilly et al. | 6,516,302 B1 | 2/2003 | Deaton et al. |
| 5,751,257 | A | 5/1998 | Sutherland | 6,609,104 B1 | 8/2003 | Deaton et al. |
| 5,759,101 | A | 6/1998 | Von Kohorn | 6,611,811 B1 | 8/2003 | Deaton et al. |
| 5,761,648 | A | 6/1998 | Golden et al. | 6,741,968 B2 | 5/2004 | Jacoves et al. |
| 5,765,143 | A | 6/1998 | Sheldon et al. | 6,993,498 B1 | 1/2006 | Deaton et al. |
| 5,771,172 | A | 6/1998 | Yamamoto et al. | 2001/0014868 A1 * | 8/2001 | Herz et al. ................... 705/14 |
| 5,781,894 | A | 7/1998 | Petrecca et al. | 2001/0021914 A1 * | 9/2001 | Jacobi et al. .................. 705/8 |
| 5,793,972 | A | 8/1998 | Shane | 2006/0100931 A1 | 5/2006 | Deaton et al. |
| 5,797,132 | A | 8/1998 | Altwasser | | | |
| 5,806,044 | A | 9/1998 | Powell | | FOREIGN PATENT DOCUMENTS | |
| 5,806,045 | A | 9/1998 | Biorge et al. | EP | 0 512 509 A2 | 11/1992 |
| 5,819,954 | A | 10/1998 | Lacriola | EP | 0 708 409 A2 | 4/1996 |
| 5,822,735 | A | 10/1998 | De Lapa et al. | EP | 0 749 091 A2 | 12/1996 |
| 5,832,456 | A | 11/1998 | Fox et al. | EP | 0 837 438 A2 | 4/1998 |
| 5,832,457 | A | 11/1998 | O'Brien et al. | GB | 1 525 928 | 9/1978 |
| 5,844,221 | A | 12/1998 | Madigan, Jr. et al. | GB | 2 094 532 A | 9/1982 |
| 5,845,259 | A | 12/1998 | West et al. | JP | 52-16941 | 2/1977 |
| 5,845,529 | A | 12/1998 | Moshe et al. | JP | 55-47560 | 4/1980 |
| 5,850,446 | A | 12/1998 | Berger et al. | JP | 56-27468 | 3/1981 |
| 5,854,746 | A | 12/1998 | Yamamoto et al. | JP | 58-155475 | 9/1983 |
| 5,855,007 | A | 12/1998 | Jovicic et al. | JP | 58-178475 | 10/1983 |
| 5,857,175 | A | 1/1999 | Day et al. | JP | 59-94166 | 5/1984 |
| 5,870,714 | A | 2/1999 | Shetty et al. | JP | 59-184965 | 10/1984 |
| 5,873,069 | A * | 2/1999 | Reuhl et al. ................... 705/20 | JP | 9-101988 | 4/1997 |
| 5,875,415 | A | 2/1999 | Lieb et al. | WO | WO 86/03310 A1 | 6/1986 |
| 5,887,271 | A | 3/1999 | Powell | WO | WO 91/03789 A1 | 3/1991 |
| 5,899,980 | A | 5/1999 | Wilf et al. | WO | WO 95/03570 A2 | 2/1995 |
| 5,905,246 | A | 5/1999 | Fajkowski | WO | WO 96/41289 A2 | 12/1996 |
| 5,907,350 | A | 5/1999 | Nemirofsky | WO | WO 97/08638 A1 | 3/1997 |
| 5,907,830 | A | 5/1999 | Engel et al. | WO | WO 97/23838 A1 | 7/1997 |
| 5,918,211 | A | 6/1999 | Sloane | WO | WO 98/14921 A1 | 4/1998 |
| 5,918,212 | A | 6/1999 | Goodwin, III | | | |
| 5,918,214 | A | 6/1999 | Perkowski | | OTHER PUBLICATIONS | |
| 5,933,813 | A | 8/1999 | Teicher et al. | | | |
| 5,937,391 | A | 8/1999 | Ikeda et al. | English Abstract for Japanese Patent Publication No. JP52016941, 1 page. | | |
| 5,963,133 | A | 10/1999 | Monjo | | | |
| 5,974,399 | A * | 10/1999 | Giuliani et al. ............... 705/14 | English Abstract for Japanese Patent Publication No. JP55047560, 1 page. | | |
| 6,003,013 | A | 12/1999 | Boushy et al. | | | |
| 6,009,407 | A | 12/1999 | Garg | English Abstract for Japanese Patent Publication No. JP56027468, 1 page. | | |
| 6,009,411 | A | 12/1999 | Kepecs | | | |
| 6,012,040 | A | 1/2000 | Goodwin, III | English Abstract for Japanese Patent Publication No. JP58155475, 1 page. | | |
| 6,014,634 | A | 1/2000 | Scroggie et al. | | | |
| 6,021,362 | A | 2/2000 | Maggard et al. | English Abstract for Japanese Patent Publication No. JP58178475, 1 page. | | |
| 6,035,280 | A | 3/2000 | Christensen | | | |
| 6,055,573 | A | 4/2000 | Gardenswartz et al. | English Abstract for Japanese Patent Publication No. JP59094166, 1 page. | | |
| 6,061,660 | A | 5/2000 | Eggleston et al. | | | |

English Abstract for Japanese Patent Publication No. JP59184965, 1 page.
English Abstract for Japanese Patent Publication No. JP9101988, 1 page.
Deaton et al., U.S. Appl. No. 11/212,140, filed Aug. 26, 2005, entitled "Method and System for Accumulating Marginal Discounts and Applying an Associated Incentive Upon Achieving Threshold".
Alba Joseph et al.; "Interactive Home Shopping"; Journal of Marketing, vol. 61, Jul. 1997, pp. 38-53.
American National Standard Specifications for Placement and Location of MICR Printing—X9.13 American Bankers Association, May 4, 1990 (22 sheets).
Amy Doan "The shopper's wallet-More and more retailers are using rewards clubs to keep customers, generate market research", San Francisco Chronicle:Jul. 31, 1998.
Antonio Feuchtwanger, "Smarter Cards Think for Themselves in US Tests," The Daily Telegraph, p. 20, Nov. 2, 1990 (printout of online version, 1 sheet).
Are You Thinking About the New Benefits of Scanning?, transcript of speech by Robert S. Ukrop, 1987 Food Marketing Institute Convention, May 5, 1987, 1 cover page and pp. 1-9.
Boyd, "New directions in supermarkets," Incentive, v168, n11, pp. 41-45, Nov. 1994.
Bradley Johnson, "Catalina Adds Coupon Options," Advertising Age, pp. 1 and 58, Nov. 26, 1990; and printout of online version (2 sheets).
Carlene A. Thissen, "Front-End electronic Marketing—Frequent Shopper and Other Programs," Food Marketing Institute, 1991; cover page and pp. i-x and 1-70.
Carlene A. Thissen, "Perspectives on Electronic Marketing with Emphasis on Promotion Inside Supermarkets," Food Marketing Institute, 3 cover pages and pp. i-v and 1-39, May 1990.
Carlene Thissen & John Karolefski, "Target 2000: The Rising Tide of TechnoMarketing," American Book Company, 1998.
Carole Sugarman, "In-Store Computer Terminals, A Super Marketing Device," The Washington Post, May 28, 1986 (printout of online verison, 4 sheets).
Catalina Marketing Corp. Outmaneuvers Citicorp POS, Industry Leader Launches Frequent Shopper Program in Electronic Network of 2,500 Stores, News Release, PR Newswire, Jun. 16, 1989 (printout of online version, 2 sheets).
Catalina Marketing Corporation, "Frequency Programs: Cashing in on Promotions," presented at The Marketing Institute, Sep. 11, 1990, pp. 1-38.
Catalina Marketing Unveils New Supermarket Continuity Programs and "Checkout Direct," Point of Scan: The Newsletter of Electronic Marketing, Jan. 1991, pp. 1 and 3.
Catalina Readies Test, Advertising Age, pp. 1 and 40, Dec. 3, 1990; and printout of online version (1 sheet).
Cathy Cebulski, "P&G, Central Trust Develop Electronic Marketing System," The Greater Cincinnati Business Record, p. 4, Mar. 26-Apr. 1, 1990.
Central Trust/P&G Card Links Shopper Purchases, Bank Marketing Magazine, Sep., 1988, p. 51 (printout of online version, 1 sheet).
Chase and Concord Join Forces To Provide Point-Of-Sale Services, Chase Manhattan Bank News Release, May 9, 1988 (3 sheets).
Checking Checks at DeMoulas, Chain Store Age Executive, vol. 59, No. 2, Feb. 1983, pp. 18-19, with printout of online abstract (1 sheet).
Checking Checks, Miami Herald, Jun. 15, 1987, p. s-17 (printout of online version, 1 sheet).
Cleveland Shoppers Save Money With New Electronic Checkout System, PR Newswire, p. 1, Nov. 17, 1988 (printout on online version, 1 sheet).
Co-op Links Scanning With Promotions, Retail Automation, Nov./Dec., 1988, pp. 21-22.
David Goldsmith, "Electronic Coupons," Target Marketing, North American Publishing Co., Jul. 1987, (1 sheet).
Death of Frequent Shopper Programs? Food and Beverage Marketing, vol. 9, No. 12, cover page and pp. 5 and 10-11, Dec. 1990; and printout of online version (2 sheets).
DIY Promos Via Video POS, Chain Store Age Executive, vol. 64, No. 4, cover page and pp. 76, 78, Apr., 1988; and printout of online version (3 sheets).

Egon Schmidt, "Der Glaserne Verbraucher", Elektronik, vol. 40, No. 23, Nov. 12, 1991, pp. 42-45; with English translation, pp. 1-13.
Fensholt, Carol; "Shelf Labels Go Electronic, Merchandising Goes Dynamic," Supermarket Business, vol. 43, No. 5, May, 1988, p. 46(4).
Focus on general merchandise, Supermarket News, v35, pS4(20), Mar. 1985.
Forger, Gary, "Real-time Control Drives JIT Success," Modern Materials Handling; Boston; vol. 47, Issue 12, Oct. 1992, extracted on Internet from Proquest database, http://progquest.umi.com on Feb. 25, 2002.
Frequent Buyer Programs Get Off The Ground, Diary Foods, Nov. 1989, p. 64 (printout of online version, 1 sheet).
Garry, Michael; "Will Supermarket Play Electronic Tag?", Progressive Grocer, Jul. 1991, pp. 99-104.
Gerald Abowitz, "Electronic MICR Printing and Check Processing," Interquest, May, 1994, 2 cover pages and pp. vii-viii and 23-36.
Getting Personal, Retail Week, Jun. 1, 1990 (1 sheet).
Giant to Test Supermarket Cash Rebates, Washington Post, Jun. 14, 1989, pp. A1, A32 (printout of online version, 1 sheet).
Grocery Stores Copy Airlines With Frequent Buyer Bonuses, Wall Street Journal 3 Star, Eastern Edition, Aug. 7, 1986, p 21 (printout of online version, 1 sheet).
GTE Joins Proctor & Gamble and Others in New Technology Partnership, PR Newswire, vol. 0, No. 0, p. 1, Jun. 26, 1990 (printout of online abstract, 1 sheet).
Hall Daniel; "Electronic Tags Aglow in 2 Units," Supermarket News, vol. 37, No. 49, Dec. 7, 1997, p. 43(1).
Hitting the Target, Retail Automation, Nov./Dec., 1990, p. 12-13.
Holly Klokis, "UKROP's Test Data Base Marketing Program—Electronic Couponing Tracks Buying Behavior of Valued Customers," Chain Store Age Executive, Sep. 1987 (3 sheets).
Instant Coupons on Video Screens Set for Test Run at Finast Checkouts, Plain Dealer, Cleveland, Ohio, Nov. 18, 1988, p. B15 (printout of online version, 1 sheet).
Interactive POS Video Yields Instant Results, Chain Store Age Executive, Sep. 1988, cover sheet and pp. 52-53 and 55.
Jeffrey Kutler, "Chase Forms Alliance with Terminal Vendor," The American Banker, May 18, 1988 (printout of online version, 2 sheets).
Jerrold Ballinger, "Coupon System Might 'Replace Mail,'" DM News, p. 1, Nov. 12, 1990 (printout of online version, 2 sheets).
Laurie Petersen, "Catalina Launches Two New Coupon Programs," Adweek, Nov. 12, 1990 (printout of online version, 1 sheet).
Lena H. Sun, "Checking Out The Customer," The Washington Post, Jul. 9, 1989 (5 sheets).
Linda P. Campbell, "Looking for Ways to Protect Privacy—Caller ID Brings Calls for Safeguards," Chicago Tribune, Sec. C, p. 21 (printout of online version, 4 sheets).
Lorrie Grant, "Let Your Fingers Do Shopping . . . In Store," USA Today, Jul. 28, 1999, p. 3B (1 sheet); and printout of online version (3 sheets).
Lynette D. Hazelton, "What's New in Supermarket Promotion—Tracking Shoppers with Personal Bar Codes", New York Times, Jun. 18, 1989 (1 sheet).
Lynn Coleman, "'Smart Card,' Coupon Eater Targeted to Grocery Retailers", Marketing News, American Marketing Association, Jun. 6, 1988, vol. 22, No. 12 (2 sheets).
Martha Groves, "Frequent-Shopper Plans are Wooing Customers," Los Angeles Times, pp. 1 and 36-37, Oct. 1, 1989 (4 sheets).
Michael Freitag, "In This Computer Age, Who Needs Coupons?" New York Times, Jun. 15, 1989 (1 sheet).
Michael Gates, "Database Marketing—The Unfulfilled Promise," Incentive, Sep. 1989 (5 sheets).
MICR 101, Xerox Internet Site, 1998 (excerpts, 20 sheets).
Mindy Fetterman, "Capturing Customers in a Cool Economy," USA Today, p. 8B, Nov. 19, 1990 (printout of online version, 1 sheet).
Mollie Neal, "Quaker's Direct Hit," Direct Marketing, vol. 53, No. 9, p. 52, Jan. 1991 (printout of online version, 5 sheets).
Murray Raphel, "Take a Card . . . Any Card Please!", Direct Marketing, pp. 63-68, Feb. 1990.
Nancy Zeldis, "Targeted Coupons Hit Non-Users," Advertising Age, p. S-26, Apr. 27, 1987 (3 sheets).

Pioneer offers special finance options for 1999; New programs designed to aid crop producers following challenging year, PR Newswire:Oct. 30, 1998.

PurPura, "Ralphs will test Secure Couponing on Internet," Supermarket News, v47, n34, p17+, Aug. 1997.

Raphel, "Take a card . . . any card please" Direct Marketing, Feb. 1990, pp. 63-68.

Rob Jackson, "Package Goods' New Target: Database Marketing," DM News, Dec. 10, 1990 (printout of online version, 6 sheets).

Robert C. Blattberg, "Assessing and Capturing the Soft Benefits of Scanning," a study conducted for the Coca-Cola Retailing Research Council, May, 1988, 3 cover pages and pp. i-iii and 1-43.

Ronald Tanner, "A New Dimension in Marketing," Progressive Grocer, vol. 66, No. 5, May 1987, cover page and pp. 133-134, 136.

Russ Stanton, "Notebook" The Orange County Register, Nov. 8, 1990 (printout of online version, 1 sheet).

Rylla R. Goldberg, "MICR Handbook", Health Printers Inc., and Goldberg Publications, 1985, 5 cover pages and pp. 1, 3, 5 and 7-65.

S&H, Saffer Reward Frequent Shoppers, Advertising Age, Mar. 16, 1987, p. 22 (printout of online version, 1 sheet).

Samuel Berke, "An Analysis of Various Check Verification Services," The Credit World, vol. 65, No. 1, Oct. 1976, pp. 20-21; with printout of online abstract (1 sheet).

Scanning A New Horizon Food & Beverage Marketing, Aug. 1989, cover page, index page, and pp. 32-33 (7 sheets).

Schedule of Presentation at May 1991 Food Marketing Institute Chicago Conference, and transcript of presentation by Robert J. Mannarino, 4 cover pages and pp. 1-14.

Sidney Feltenstein, et al., "Does Couponing Make Good Business Sense?," Restaurant Business Magazine, vol. 90, No. 2, p. 152, Jan. 20, 1991 (printout of online version, 2 sheets).

SSDS Inc., and Inter-Act Systems implement new "clipless" coupon program in major grocery stores in the Northeast. Business Wire, p. 9041023, Sep. 4, 1996.

Stop Bad Check Losses—Without Lifting the Phone, Drug Topics, Sep. 15, 1986, p. 42 (printout of online version, 1 sheet).

Stuart Elliot, "A Last Hurdle for Shoppers: The Checkout-Counter Pitch," New York Times, late ed., Jan. 11, 1993, Sec. D., front page and p. 7 (4 sheets); and printout of online version (2 sheets).

Supermarket Trims Bad Check Losses Via On-Line Authorization, The Data Communications User, Jul. 1975, pp. 41-42.

Susan Bass and Jerrold Ballinger, "Early Use of Supermarket Scanners Bring DM and Sales Promotion Closer: Professors," DM News, p. 30, Mar. 1, 1989 (printout of online version, 4 sheets).

Susan Zimmerman, "Holiday Expands Electronic Couponing", Supermarket News, vol. 38, No. 33, Aug. 14, 1988 (2 sheets).

Tina Cassidy, "Confusion Reigns Over Checking and Credit Card Law," Boston Business Journal, pp. 1, 19, Apr. 6, 1992 (3 sheets).

Trying to Get Smart, Retail Automation, May/Jun., 1989, pp. 9-10.

U.S. Appl. No. 09/320,114, entitled "Method and System for Providing Customer Incentives Utilizing Dual Customer Identifications," inventor(s) Deaton et al., May 26, 1999.

U.S. Appl. No. 09/354,263, entitled "Point-of-Sale Server and Method," inventor(s) Deaton et al., Jul. 15, 1999.

U.S. Appl. No. 09/372,356, entitled "Method and System for Coupon Redemption Verification and Crediting," inventor(s) Deaton et al., Aug. 11, 1999.

U.S. Appl. No. 09/372,376, entitled "Method and System for Responding to Market Conditions," inventor(s) Deaton et al., Aug. 11, 1999.

U.S. Appl. No. 09/372,412, entitled "Method and System for Facilitating Consumer Purchases," inventor(s) Deaton et al., Aug. 11, 1999.

U.S. Appl. No. 09/372,446, entitled "Method and System for Price Reduction Reconciliation," inventor(s) Deaton et al., Aug. 11, 1999.

U.S. Appl. No. 09/372,451, entitled "Method and System for Compliling a Plurality of Incentives Directed to a Common Recipient," inventor(s) Deaton et al., Aug. 11, 1999.

U.S. Appl. No. 09/372,452, entitled "Method and Apparatus for Filtering Point-of-Sale Information," inventor(s) Deaton, et al., Aug. 11, 1999.

U.S. Appl. No. 09/375,603, entitled "Method and System for Providing Customer Incentives Utilizing Dual Customer Identifications, and Differentiated Incentives," inventor(s) Deaton et al., Aug. 17, 1999.

U.S. Appl. No. 09/376,545, entitled "Method and System for Providing Customer Incentives at the Point-of-Sale," inventor(s) Deaton et al., Aug. 18, 1999.

U.S. Appl. No. 09/378,779, entitled "Method and System for Providing Customer Incentives Utilizing Dual Customer Identifications," inventor(s) Deaton et al., Aug. 19, 1999.

U.S. Appl. No. 09/395,306, entitled "Method and System for Providing Customer Incentives Utilizing Dual Customer Identifications and Selected Products," inventor(s) Deaton et al., Sep. 13, 1999.

U.S. Appl. No. 09/396,838, entitled "Method and System for Providing Customer Incentives Utilizing Communication of Selected Product Incentives," inventor(s) Deaton et al., Sep. 15, 1999.

U.S. Appl. No. 09/398,123, entitled "Method and System for Customer Promotion," inventor(s) Deaton et al., Sep. 16, 1999.

U.S. Appl. No. 09/414,829, entitled "Method and System for Differentiated Customer Promotion," inventor(s) Deaton et al., Oct. 6, 1999.

U.S. Appl. No. 09/414,830, entitled "Method and System for Differentiated Customer Promotion," inventor(s) Deaton et al., Oct. 6, 1999.

U.S. Appl. No. 09/420,639, entitled "Method and System for use in Generating an Advertising Message," inventor(s) Deaton et al., Oct. 21, 1999.

U.S. Appl. No. 09/885,045, entitled "Method and System for Generating Incentives in Response to Substantially Real-Time Product Purchase Information," inventor(s) Deaton et al., Jun. 19, 2001.

Virginia Miller, "The Vonschek: Electronic Checkwriting With Built-In Float", presented at The Supermarket Industry's Convention, Chicago, May 10, 1988, cover sheet and pp. 1-5.

Web-Based Couponing, Ads Tested at Randalls (Randalls Food Markets tests link to web sites that offers a customized virtual store in which customers can find store specials and download coupons); Supermarket News, v. 47, n. 22, p. 25+, Jun. 2, 1997.

What Are We Learning About Electronic Marketing, Willard Bishop Consulting Ltd., Competitive Edge, pp. 1-4, Jun., 1990.

Zimmerman, Denise; "Electronic Sticker Shock: Retailers Say Cost Is a Drawback . . . of Electronic Shelf Labels," Supermarket News, vol. 45., No. 38, Sep. 8, 1995, p. 17(2).

Zimmerman, Denise; "Fiesta Mart to Test Radio Shelf Labeling," Supermarket News, vol. 45, No. 6, Feb., 1995, p. 9(2).

U.S. Appl. No. 11/212,140, entitled "Method and System for Accumulating Marginal Discounts and Applying an Associated Incentive upon Achieving Threshold," inventor Deaton et al. Aug. 26, 2005, 185 pgs.

* cited by examiner

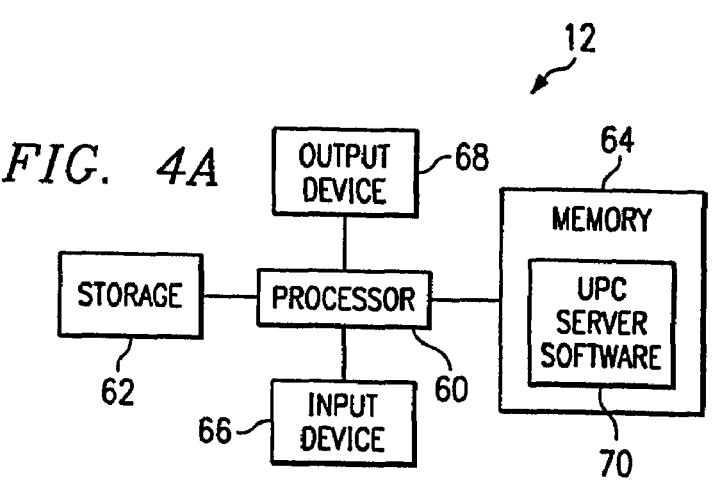
FIG. 4A
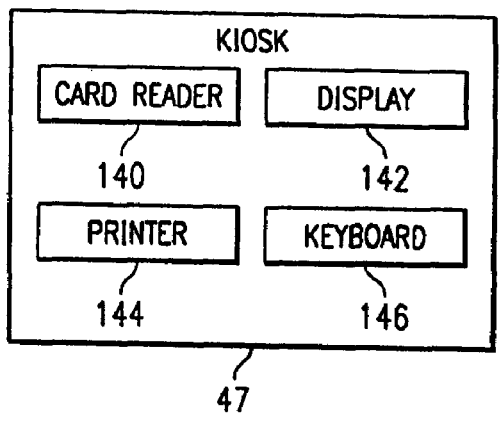
FIG. 4B
FIG. 5
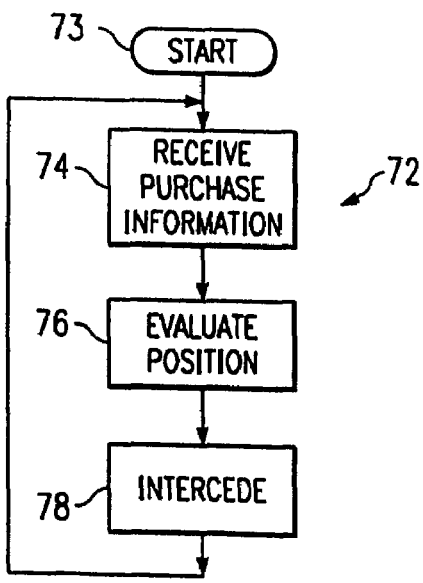
FIG. 6A
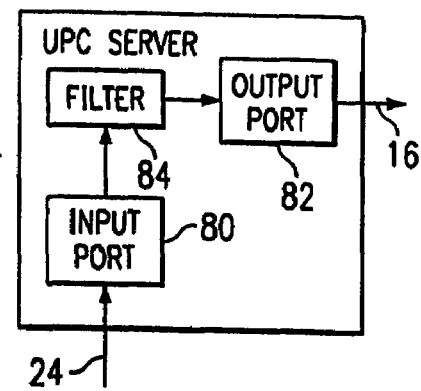

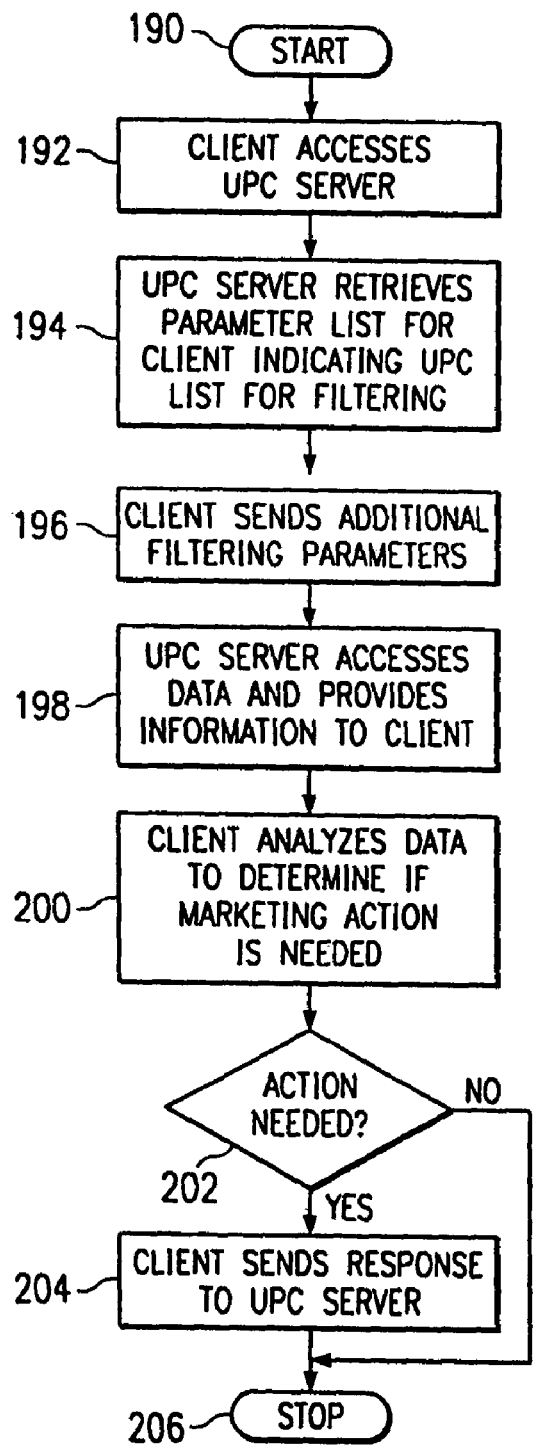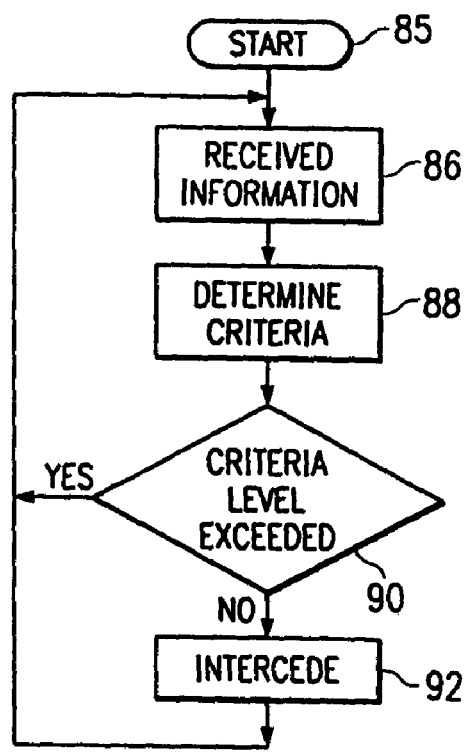

METHOD AND SYSTEM FOR FACILITATING CONSUMER PURCHASES

CROSS REFERENCE TO RELATED APPLICATIONS

This application is a continuation and claims priority to U.S. patent application Ser. No. 09/372,412 filed Aug. 11, 1999, now abandoned by Deaton et al., entitled "Method and System for Facilitating Consumer Purchases", which is a continuation-in-part of U.S. patent application Ser. No. 09/354,263 filed Jul. 15, 1999 entitled "Point of Sale Server and Method" to Deaton et al., which is abandoned.

BACKGROUND OF THE INVENTION

1. Field of the Invention

This invention relates generally to the marketing and more particularly to a method and system for facilitating consumer purchases.

2. Background Art

Market surveys and research provide a manufacturer with information that it may use to respond to changing market conditions. For example, surveys may be conducted which ask consumers whether they favor a particular product over another. In addition, the actual past sales of a manufacturer's product may be compiled and analyzed.

Although some product information is available from these techniques, relying on conventional techniques for assessing one's place in the market may provide less than satisfactory results. For example, by the time market research informs a manufacturer that his product is under performing in a particular market, the manufacturer may not have time to appropriately respond. Furthermore, temporary market conditions may affect the purchase of a particular manufacturer's product or its competitor's products, and these temporary conditions may no longer be applicable by the time conventional market research analysis is completed.

U.S. Pat. No. 4,972,504, entitled "Marketing Research System and Method for Obtaining Retail Data on a Real-Time Basis" to James N. Darrel, Jr., is exemplary of prior retail store marketing systems. The patent describes a system that stores retail data on a real-time basis and subsequently provides information remotely. The described system does not, however, communicate the data to a remote location, on a substantially real-time basis, allowing manufacturers or other clients to respond to market conditions rapidly; nor does the described system enable rapid response back to the point-of-sale to vary marketing parameters.

BRIEF SUMMARY OF THE INVENTION

Accordingly, a need has arisen for a method and system for facilitating consumer purchases that addresses shortcomings of prior methods and systems.

According to one embodiment of the invention, a method for use in marketing includes detecting, at a remote computer, product purchase information of a plurality of retail stores. The product purchase information includes price information. The remote computer is located remote from the retail store. The method also includes receiving, at the remote computer, a shopping list of a customer. The shopping list includes at least one item. In response to receiving the shopping list, communication to the customer of price information associated with at least one item on the shopping list for the plurality of retail stores is initiated by the remote computer According to another embodiment of the invention, a system includes a computer for coupling to at least one retail store. The computer includes a processor, a memory accessible by the processor, and a computer program stored in the memory. The computer program is operable to be executed on the processor and further operable to detect product purchase information from the at least one retail store. The product purchase information includes price information. The computer program is further operable to receive a shopping list of a customer, the shopping list includes at least one item. The computer program is further operable to initiate communication to the customer of price information associated with the at least one item on the shopping list from each of the at least one retail stores in response to receiving the shopping list.

Embodiments of the invention provide numerous technical advantages. For example, in one embodiment of the invention, a manufacturer is provided access to real-time product purchase information. This real-time access allows the manufacturer to respond appropriately to market condition. For example, a manufacturer may effect a price reduction in stores of products that are being purchased in less than desired quantities. In addition, a manufacturer may provide customer incentives, such as redeemable coupons, on a real-time basis to particular customers identified to the manufacturer through substantially real-time purchasing data. Such an ability allows a manufacturer, for example, to market its products to purchasers of competing products.

According to another embodiment of the invention, a customer may submit a shopping list and receive price information associated with the shopping list from a plurality of different stores. Such reception allows a customer to, from the customer's home, comparison shop and select an appropriate store from which to actually purchase the desired products. Furthermore, manufacturers, stores, and other clients may response to the customer shopping list with appropriate incentives.

Other technical advantages are readily apparent to one skilled in the art from the following figures, descriptions and claims.

BRIEF DESCRIPTION OF THE DRAWINGS/FIGURES

For a more complete understanding of embodiments of the invention and the advantages thereof, reference is now made to the following descriptions taken in connection with the accompanying drawings in which:

FIG. 4A is a block diagram of the UPC server illustrated in FIG. 1;

FIG. 4B is a block diagram of one embodiment of the kiosk of FIG. 2D;

FIG. 5 is a flow chart illustrating a summary of steps performed in conjunction with the system of FIG. 1 to allow a plurality of manufacturers to market their products to customers;

FIG. 6A is a block diagram illustrating an example server of the system of FIG. 1, showing units for receiving information, filtering that information, and distributing the filtered information to appropriate manufacturers;

FIG. 6E is a flow chart illustrating a method for accessing point-of-sale information from the UPC server of FIG. 1;

FIG. 7 is a flow chart illustrating automatic response by a manufacturer in response to the meeting of certain thresholds relating to the manufacturer's products;

DETAILED DESCRIPTION OF THE INVENTION

Embodiments of the invention and their advantages are best understood by referring to FIGS. 1 through 12 of the drawings, like numerals being used for like and corresponding parts of the various drawings.

Figure 1:
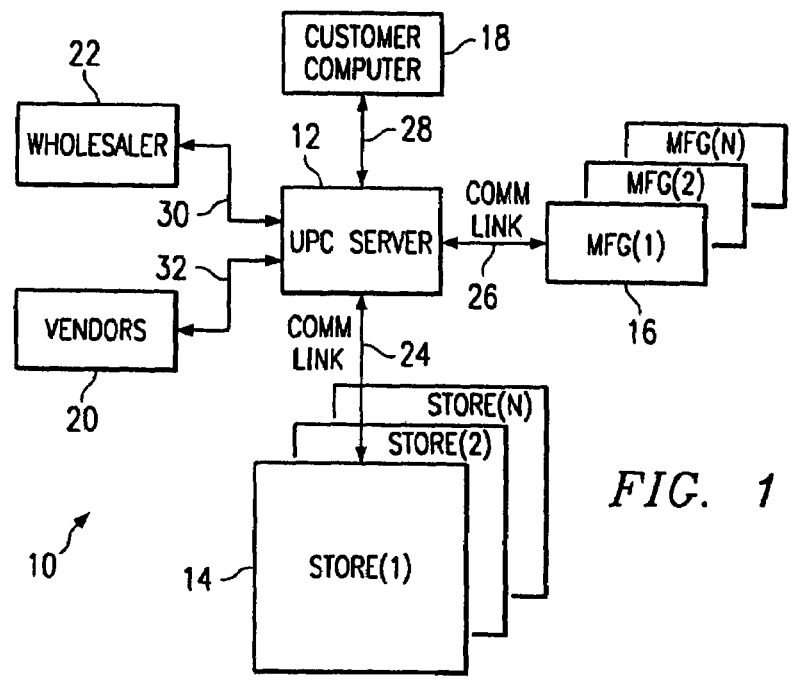
FIG. 1 is a block diagram of a system for providing point-of-sale information to a manufacturer.

FIG. 1 is a block diagram of a system 10 for providing point-of-sale information to a manufacturer 16. System 10 includes a UPC server 12 connected to one or more stores 14 by a communication link 24. System 10 also includes one or more manufacturers 16 connected to UPC server by communication link 26. In addition to manufacturers 16, vendors 20 and wholesalers 22 may also be connected to UPC server 12 by communications links 32 and 30, respectively. Vendors 20, wholesalers 22, manufacturers 16, retailers 14, or any other entity that subscribes to the services offered by UPC server 12 may be referred to herein as clients. Each client may utilize a computer analogous to the computer illustrated in FIG. 2E to effect their various functions described below. System 10 also includes a customer computer 18 for accessing UPC server 12 via communication link 28. According to one embodiment of the invention, communications links 24, 26, 30, and 32 utilize the Internet.

According to the teachings of the invention, point-of-sale information obtained at store 14 is communicated on a substantially real-time basis to UPC server 12. Such point-of-sale information may include UPC codes for purchased products, UPC codes for redeemed coupons, prices of purchased products, other suitable identifications of purchased products, and other suitable data obtained at the point-of-sale, including codes not currently used. Additional point-of-sale information may include a store identification such as an Internet address, the register or lane number, and additional data such as lines of print sent to the receipt tape, smart card contents, customer identification numbers and receipt lines including item description, quantity, and price, and receipt total. The entire contents of a customer's smart card may also be provided to UPC server 12. In addition, payment instrument data such as credit card number, check number, and debit card number may be transferred. Such numbers may be used as unique customer identification codes for identifying particular customers. The identification of particular customers allows determining what products a particular customer purchases, which may be used in marketing.

The communicated information received by UPC server 12 is then made available on a substantially real-time basis to manufacturers 16, vendors 20, wholesalers 22, or other appropriate clients, including stores 14. By providing point-of-sale information on a substantially real-time basis, manufacturers 16, vendors 20, and wholesalers 22 may respond to the purchase or non-purchase of goods or services associated, respectively, with manufacturers 16, vendors 20, wholesalers 22 and stores 14. For example, a manufacturer 16 may receive point-of-sale information indicating a market share far below its normal market share. In such a case, manufacturer 16 may instantly lower prices on its goods to be more competitive.

Furthermore, a manufacturer 16 or other client may offer, on an individualized basis, incentives to a customer of store 14 based upon the customers past purchasing history, purchases made in a current transaction, a combination of these purchases, or regardless of the purchases of the customer. According to one embodiment, by providing point-of-sale information on a substantially real-time basis to, for example, manufacturer 16, individualized customer incentives may be provided by the manufacturer that relate to the recent purchase, or non-purchase, and the associated prices of products from a particular store or group of stores. Although particular embodiments are described showing a common UPC server shared by a plurality of clients, it should be understood that, in some embodiments, UPC server 12 or a similar apparatus may be located at a particular client, such as manufacturer 16, enabling manufacturer 16 to communicate directly with store 14 without the use of an intermediary.

Figure 2A:
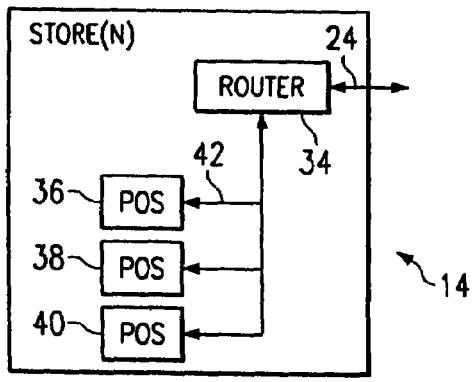
FIG. 2A is a block diagram of a store showing details of a portion of the system of FIG. 1 for providing information from the point-of-sale to a manufacturer.

FIG. 2A is a block diagram of store 14 showing details of a portion of the system of FIG. 1 for providing information from a point-of-sale 36, 38, and 40 to a manufacturer 16. Store 14 includes a plurality of points-of-sale 36, 38, and 40. Each of the points-of-sale is connected to a router 34 via a communication link 42. Router 34 receives information from each of the points-of-sale 36, 38, and 40 on a substantially real-time basis and directs such information, on a substantially real-time basis, over communication link 24 to UPC server 12, illustrated in FIG. 1. Points-of-sale 36, 38, and 40 are described in greater detail below in conjunction with FIG. 3.

Figure 2C:
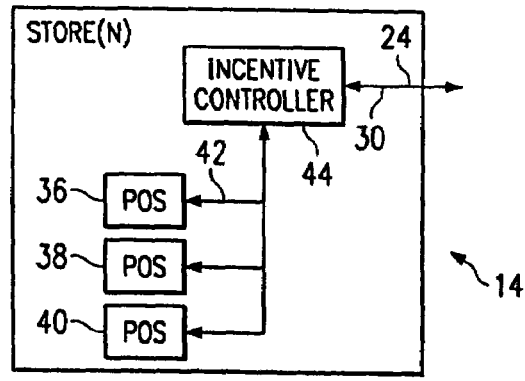
FIG. 2C is a block diagram of a store showing alternative details of a portion of the system of FIG. 1 for providing point-of-sale information to a manufacturer.
Figure 2B:
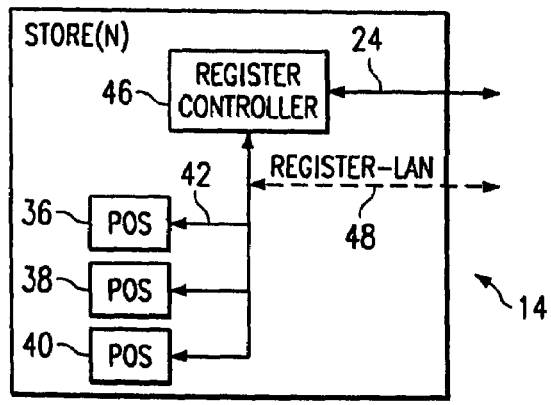
FIG. 2B is a block diagram of a store showing alternative details of a portion of the system of FIG. 1 for providing point-of-sale information to a manufacturer.

FIG. 2B is a block diagram of a store 14 showing alternative details of a portion of system 10 for providing point-ofsale information to manufacturer 16. In this embodiment of store 14, router 34, and incentive controller 44 are replaced with a register controller 46. In this embodiment, register controller 46 operates to provide information to points-of-sale 36, 38, and 40 related to product prices and descriptions and, in addition, transmits point-of-sale information to manufacturers 16 over communication link 24. In addition, register controller 46 receives information from manufacturers 16 for delivery to the customer at the points-of-sale 36, 38, 40. Such an embodiment incorporates the design of register controller 46 for reception of information from manufacturers 14 according to some standard protocol. Alternatively, a register local area network 48 may be tapped into and point-of-sale information may be provided to manufacturers 16 without designing register controller according to a particular protocol.

FIG. 2C is a block diagram of store 14 showing alternative details of a portion of system 10 for providing point-of-sale information to a client, such as manufacturer 16. In this embodiment of store 14, router 34 is replaced with an incentive controller 44. Incentive controller 44 receives point-of-sale information directly from points-of-sale 36, 38, and 40 on a substantially real-time basis over, for example, communication link 42. Incentive controller 44 then transmits the point-of-sale information on a substantially real-time basis over communication link 24 to UPC server 12. Alternatively, incentive controller 44 is associated with points-of-sale 36, 38, 40, but store 14 communicates with UPC server 12 through other means.

Whether or not connected to UPC server 12, incentive controller 44 may provide incentives, such as redeemable coupons or a written notification of a future product discount or advertising message, to customers at points of sale 36, 38, 40, recommend such incentives to manufacturer 16, or process incentives generated by manufacturer 16. Incentive controller 44 may also be used in validating product purchases in conjunction with products offered at a discount or for products for which coupons are redeemed. Incentive controller 44 may generate incentives based upon a customer's past purchasing history, a customer's present purchases, a combination of these two, or other suitable techniques.

Exemplary methodology for generating incentives by incentive controller 44 is described in U.S. Pat. No. 5,687,322 to Deaton et al., which is incorporated herein by reference for all purposes and in U.S. patent application Ser. No. 09/320, 114 to Deaton et al., entitled Method and System for Providing Customer Incentives Utilizing Dual Customer Identifications, which is incorporated herein by reference for all purposes. Incentive controller 44 may be formed integral with a register controller used by store 14 (not explicitly shown in FIG. 2C) that controls registers associated with each point-of-sale. For example, the register controller may provide each individual register information associating each bar code with a description and associated price.

Figure 2D:
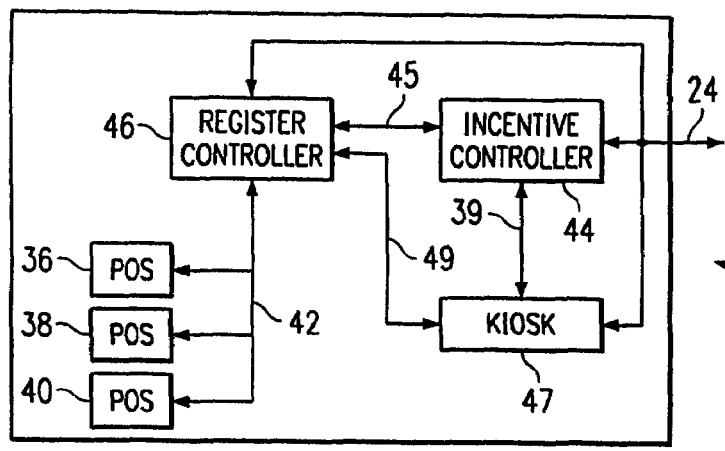
FIG. 2D is a block diagram of a store showing alternative details of a portion of the system of FIG. 1 for providing point-of-sale information to a manufacturer.

FIG. 2D is a block diagram of store 14 showing alternative details of a portion of system 10 for providing point-of-sale information to a client, such as manufacturer 16. In this embodiment, store 14 includes a kiosk 47. Kiosk 47 allows a customer of store 14 to view and select incentives available to the customer. Details of one example of kiosk 47 are described in greater detail in conjunction with FIG. 4B. In the illustrated embodiment, kiosk 47 is connected to UPC server 12 by communication link 24; however, a kiosk may be utilized that is either not connected to UPC server 12 or that is indirectly connected to UPC server 12 through another element at store 14. Register controller 46 and incentive controller 44 are also illustrated in FIG. 2D. Register controller 46 is connected to kiosk 47 by a communication link 49. Register controller 46 is connected to incentive controller 44 by communication link 45. Incentive controller 44 is connected to kiosk 47 by communication link 39.

According to the teachings of the invention, point-of-sale information is communicated through communication link 24 to UPC server 12. Such information is then communicated to a manufacturer 16. In response to receiving information from the point-of-sale, manufacturer 16 may communicate, through UPC server 12, incentives to be communicated to a customer of store 14. Kiosk 47 provides a way for the incentive to be communicated to the customer.

Kiosk 47 receives an incentive over communication link 24. A customer entering store 14 may proceed to kiosk 47 to determine what incentives are available. Kiosk 47 may then provide the customer a printed redeemable coupon or communicate a future electronic discount. In the case of a printed redeemable coupon, a coupon is distributed by kiosk 47 that may be redeemed at point-of-sale 36, 38, 40. In the case of a future electronic discount, the customer is identified at kiosk 47 by, for example, a customer loyalty card, a smart card, a credit card, a debit card, or other method of identification. After identification, an incentive available to the customer is communicated to the customer by, for example, printing of the incentive on a viewable screen or on a printer. In addition to communicating the future electronic discount to the customer, kiosk 47 communicates the future electronic discount to incentive controller 44 for application when the customer is identified at point-of-sale 36, 38, 40 and the customer purchases the product associated with the future electronic discount. As an alternative, kiosk 47 may communicate incentives available to all customers, as opposed to particularly identified customers, in which case communication of individual electronic discounts to incentive controller 44 is unnecessary. Furthermore, kiosk 47 may issue redeemable coupons to identified or unidentified customers.

It should be understood that although a particular configuration of store 14 is illustrated in FIG. 2D, other configurations may be utilized, including combining register controller 46 and incentive controller 44 into a single integrated device, combining incentive controller 44 and kiosk 47 into a single integrated device, and eliminating redundant communication links. For example, according to one embodiment, kiosk 47 and register controller 46 may be connected to UPC server 12 solely through incentive controller 44, and register controller 46 may be connected to kiosk 47 solely through incentive controller 44.

Figure 2E:
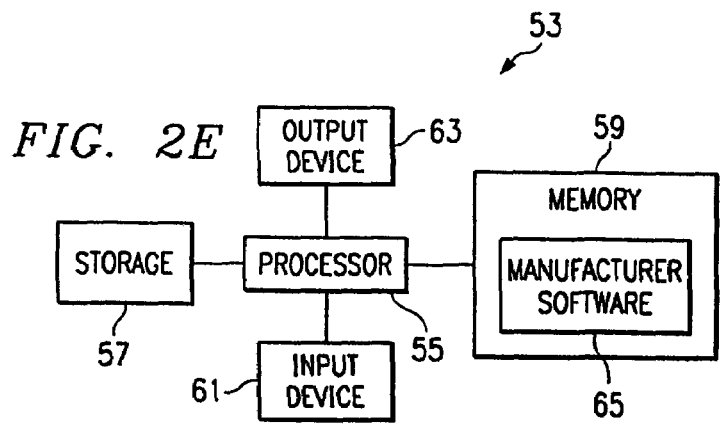
FIG. 2E is a block diagram of an example manufacturer computer for use in the system of FIG. 1.

FIG. 2E is a block diagram of one example of a manufacturer computer 53 that may be used to perform functions of manufacturer 16. In the example illustrated in FIG. 2E, manufacturer computer 53 includes a processor 55 associated with a storage device 57 and a memory device 59. Processor 55 may also be associated with an input r device 61 and an output device 63. Memory 59 includes manufacturer software 65. Manufacturer software 65 may be executed by processor 55 while stored in memory 59. Alternatively, manufacturer software may be executed from storage area 57. Manufacturer software 65 contains software coding sufficient to execute the functions performed by either manufacturer 16 or manufacturer computer 53 described below. Manufacturer computer 53 may also be implemented in various other forms, including the use of ASICs or other hardware configurations.

Figure 3:
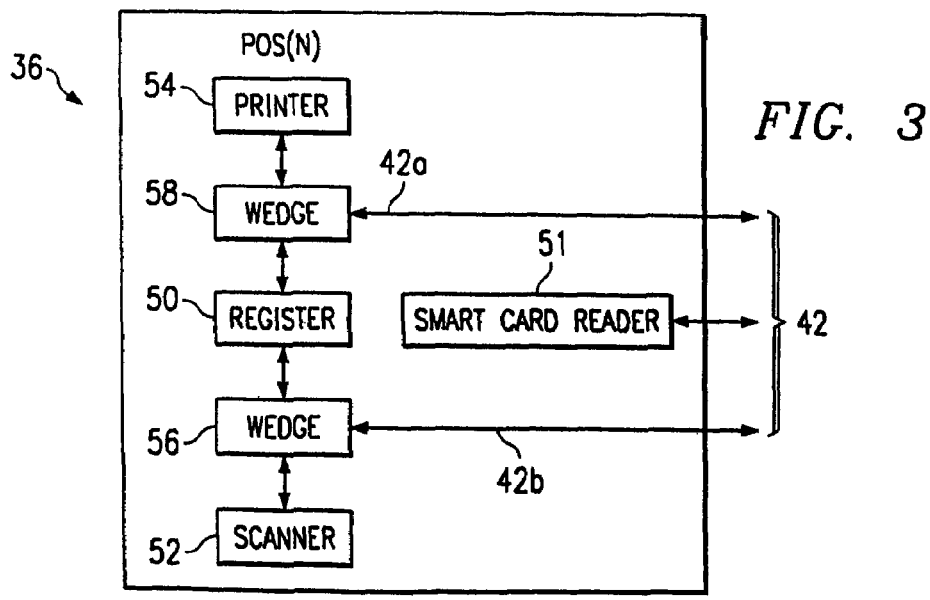
FIG. 3 is a block diagram of the points-of-sale illustrated in FIGS. 2A, 2B, and 2C showing additional details of one embodiment of a point-of-sale.

FIG. 3 is a block diagram of particular examples of points-of-sale 36, 38, and 40 illustrated in FIGS. 2A, 2B, and 2C showing additional details of one embodiment of a point-of-sale 36. Although point-of-sale 36 includes 4a particular collection of items, "point-of-sale" as used herein below without a reference numeral refers to the general location at which products are purchased. Point-of-sale 36 includes an electronic cash register 50. Electronic cash register 50 receives a signal indicative of the bar code of an item scanned by a scanner 52. A scanned item may include a product for purchase, a coupon being redeemed, or other suitable item bearing a scannable code. Based upon the signal indicative of the UPC bar code, a price is associated with the scanned item as well as a description of the scanned item. The price of the item and the description are printed on a printer 54. The price and description of an item are associated with a scanned bar code through communication of register 50 with a register controller (not explicitly controlled). In the case of a single point-of-sale 36, register 50 may itself maintain a database associating bar codes with related price and product descriptions.

Between scanner 52 and register 50 is a wedge 56. Wedge 56 intercepts information from scanner 52 and provides it along communication link 42B to router 34. A wedge allows a single signal to be split into multiple signals for receipt by multiple devices or, either alternatively or in combination, allows a signal to be inserted onto an existing communication link. An example of wedge 56 is an RS-232 Y-cable used to enable two devices, for example computers, to share a single serial device; however, other suitable wedges may be utilized. Therefore, by providing a signal indicative of the bar code of a scanned item, wedge 56 allows generation of information describing products and coupons scanned at the point-of-sale. Similarly, a wedge 58 disposed between register 50 and printer 54 receives information from register 50, allowing transmission of information along communication link 42A describing price and product information.

In addition to providing point-of-sale information, wedges 56 and 58 may receive information generated by manufacturers 16 for providing to a customer at point-of-sale 36, such as customer incentives. For example, a manufacturer may offer a customer a coupon for a product in response to the customer's purchase of particular products. Upon receiving information describing the customer's purchase, manufacturer 16 may provide a signal through point-of-sale server 12 directed for a customer utilizing point-of-sale 36. Communication link 42A may carry such a signal to wedge 58 and it may be printed on printer 54, informing the customer of the incentive. Alternatively, a separate printer or a monitor at the point-of-sale may be used to communicate incentives to customers.

A smart card reader 51 may be connected to communication link 42. Smart card reader 51 receives a smart card storing an identification of a customer. The smart card also includes a memory for storing awards. Thus, through smart card reader 51, awards may be generated and applied at point-of-sale 36, 38, 40.

FIG. 4A is a block diagram of one example of UPC server 12. UPC server 12 may be implemented in many forms. In the example illustrated in FIG. 4A, UPC server 12 includes a processor 60 associated with a storage device 62 and a memory device 64. Processor 60 may also be associated with an input device 66 and an output device 68. Memory 64 includes UPC server software 70. UPC server software 70 may be executed by processor 60 while stored in memory 64. Alternatively, UPC server software may be executed from storage area 62. UPC server software 70 contains software coding sufficient to execute functions performed by UPC server 12 described in greater detail below. UPC server 12 may also be implemented in various other forms, including the use of ASICs or other hardware configurations.

In addition to providing substantially real-time product purchase information to manufacturer 16, vendor 20, wholesaler 22, and customer computer 18, UPC server 12 may generate incentives for application at store 14. These incentives may be generated on behalf of manufacturer 16, vendor 20, wholesaler 22, store 14, or for other reasons. Thus, any of the plurality of incentives described herein below as being generated by any particular client or store may also be generated by UPC server 12 on behalf of the client or store or on behalf of the operator of UPC server 12.

FIG. 4B is a block diagram illustrating one embodiment of kiosk 47. In the illustrated embodiment kiosk 47 includes a card reader 140, a display 142, a printer 144, and a keyboard 146; however, other suitable kiosks may be used. For example, kiosk 47 may include a separate smart card reader for receiving a smart card. Display 142 may communicate incentives and provide additional information to a customer. Display 142 may be a touch-sensitive screen for receiving information from the customer, such as information related to which incentives the customer desires. Keypad 146 also allows a customer to provide information to kiosk 47. For example, a customer may provide a name, address, telephone number, or other suitable indication of the customer's identity. Card reader 140 may also be used to identify a customer by receipt of a customer card, credit card, debit card, or other instrument from which the customer's identity may be determined. In one embodiment, card reader 140 is operable to read bar codes printed on a customer card. Printer 144 may be used in conjunction with display 142 to generate a shopping list of items for which the customer will receive discounts when the items are purchased. Kiosk 47 may be used in conjunction with distribution of incentives as described above in conjunction with FIG. 2D. Other identification systems may also be utilized, such as appropriate systems described in U.S. patent application Ser. No. 09/320,114, identified above, including fingerprint identification.

FIG. 5 is a flow chart 72 illustrating a summary of steps performed in conjunction with system 10 to allow a manufacturer 16 to market its products to customers of store 14. Such steps may be performed by manufacturer computer 53 in conjunction with UPC server 12. The process begins at a step 73. At a step 74, manufacturer 16 receives point-of-sale purchase information from UPC server 12. Point-of-sale purchase information is provided to UPC server 12 from store 14 through communication link 24. According to one embodiment, communication link 24 provides Internet access to store 14 and therefore, connects UPC server 12 to store 14 via the Internet. According to the embodiment illustrated in FIG. 2A, such point-of-sale information is provided from individual points of sale 36, 38, 40 to a router 34 for transmission along communication link 24. In the embodiment illustrated in FIG. 2B, such point-of-sale information is provided by points of sale 36, 38, and 40 to an incentive controller 44, for communication over communication link 24 to point-of-sale server 12. In the embodiment illustrated in FIG. 2C, such point-of-sale information is provided by points of sale 36, 38, and 40 to either a register controller 46 for communication over communication link 20 to UPC server 12, or by eavesdropping by UPC server 12 on a register local area network 48 associated with store 14. In each of the above embodiments, according to one example system, each of the points of sale 36, 38 and 40 provide information to respective controllers or to UPC server 12 through the use of wedges, such as wedges 56 and 58. According to another example system, wedges 56, 58 are not utilized and product purchase information is obtained from a register controller, such as register controller 46, incentive controller 44, or from register LAN 48.

After point-of-sale information is received by UPC server 12, point-of-sale information is transmitted on a substantially real-time basis over communication link 26 to manufacturer 16. In the embodiment illustrated in FIG. 1, communication link 26 is an Internet connection between manufacturers 16 and UPC server 12; however, other suitable connections may be established including satellite links, wireless communications, phone lines, and dedicated lines.

At a step 76, manufacturer 16 may evaluate the point-of-sale information it has obtained from UPC server 12. Evaluation of such information may allow a manufacturer 16 to assess whether its products are selling according to desired parameters. For example, a manufacturer may assess the market share of a particular product in a particular geographic region.

After evaluating the position of its products at step 76, a manufacturer may intercede at step 78 to attempt to effect increased purchases of the manufacturer's products at step 78. Such intercession may take a variety of forms. For example, manufacturer 16 can initiate offers to customers by e-mail, can initiate offers through the use of kiosks conventionally located in stores such as retail stores, can initiate offers for immediate communication at the point-of-sale, can communicate notification of a future electronic discount at the point-of-sale, and manufacturer 16 may take other applicable action. Additionally, manufacturer 16 may communicate an incentive through UPC server 12 for receipt by a customer of retail store 14. Alternatively, the above-described functionality may also be implemented within UPC server 12 on behalf of manufacturer 16. Because point-of-sale information is communicated on a substantially real-time basis to UPC server 12, incentives may be communicated, if desired, to a customer prior to the customer leaving store 14.

Generation of the above-described incentives may include the methodology described in U.S. Pat. No. 5,687,322 to Deaton et al, including generating incentives based on the purchases of a customer, including examination of the products purchased by the customer in past and/or present transactions or the customer's economic impact on manufacturer 16, as measured by the volume of purchases by a particular customer. Such volume may be measured by dollar amount or other suitable criteria. Generation of incentives to individual customers may also be performed without reference to the market position of any particular product of a manufacturer 16. In each of these examples, UPC server 12 may act as an intermediary to maintain privacy concerns of particular individuals shopping at store 14. Thus, UPC server 12 can block, or prevent, providing of any of these types of offers to the customer. UPC server 12 may act as an intermediary by maintaining, and not providing to manufacturer 16, information that would allow manufacturer 16 to determine the identity of any individual. For example, e-mail addresses and physical addresses may be maintained only by UPC server 12 and not provided to manufacturers 16.

In addition to providing incentives to the individual customers, a manufacturer 16 may intercede by, in response to assessing its position in the market on a substantially real-time basis, effect a price change in particular products. Such a price change may be effected through traditional techniques or may utilize UPC server 12 to communicate to retail store 14 that the manufacturer 16 is implementing a price reduction. Such price reduction could include an automatic discount on the selling price at store 14, which would be subsidized by manufacturer 16, or may involve a direct discount to the retail store with a subsequent price change in the selling price at the store 14 determined by the operator of store 14.

Furthermore, a manufacturer may communicate incentives to customers independent of the current market position of its products and/or independent of the purchases of a particular customer in a current transaction. Alternatively, UPC server 12 may generate and communicate incentives, such as those described in U.S. Pat. No. 5,687,322, or elsewhere herein, to customers for the benefit of retail store 14, manufacturer 16, or other clients.

Information that may be transmitted to store 14 by UPC server 12 may include electronic discounts, lines of print for the register printer or an auxiliary printer for communication of messages to the customer, information sent back for writing to the customer's smart card to update things such as point totals, purchase profiles, etc.

Demographics may also be introduced to provide real-time purchase data based on national, regional, state, city, neighborhood, and even store levels. Purchases by identified customers may be presented to manufacturers based on, for example, customer's total spending levels; customer's level of spending on that manufacturer's products; customer's level of spending on competitor's products; customer's level of spending on a department, product class, or product family; and customer's level of spending on complimentary or companion products, and other customer data such as size of the household, household income, etc.

The substantially real-time product purchase information may also be utilized by manufacturer computer 53 or UPC server 12 to effect incentives on particular products based on the particular product's price relative to a competitive product. Thus, it can be determined that the price of a particular product exceeds the price of a competitive product and therefore a price reduction may be effected to beat or match the price of the competitive product. By implementing such a system, a customer may be assured that there are no competitive products that are offered at a lower price, and therefore the customer would be induced to loyalty to the particular product and would be alleviated from the burden of having to comparison shop.

This type of price matching or beating could be implemented for all customers or for only particular customers. Such particular customers may include customers that are loyal to a particular brand of product, customers that are loyal to a particular product, or customers that are loyal to a particular manufacturer or store. Furthermore, the particular customers may be selected by customers who have traditionally not been loyal to any particular brand, store, or product but rather may be perceived to frequently comparison shop.

The determination that a price of a particular product exceeds a competitive product may be made on a substantially real-time basis, thus a customer may be assured that it is highly unlikely that it is purchasing a product at a higher price than a competitive product could be purchased at that time. For example, although the present invention contemplates substantially real-time communication, it may be appropriate to market to customers that if any competitive product is sold at a particular retail store, or one of a plurality of retail stores, within the past thirty minutes or hour, that the price of the particular product will be reduced to match or beat the price of the competitive item.

Similarly, UPC server 12 may grant incentives to customers at store 14, such as immediate electronic discounts, that ensure that the price at which a particular product is purchased by the customer is the same or lower than the price at which any other customer has purchased a product within a predetermined time period from the retail store 14 or, alternatively, from a group of retail stores 14. Such pricing may be implemented for particular customers, such as customers who are perceived to be comparison shoppers, or customers who have been determined to be particularly loyal to a store or brand, or other criteria. Loyalty may be measured through the customer's past purchases. Marketing to a customer that his purchases on particular products or all products will be priced at or below the lowest price at which the products have been purchased from a given store may induce loyalty to a particular store. Therefore, although each of the above-described types of clients may find such a process useful, retail store 14 may find such a process particularly desirable.

The flow of information from UPC server 12 to any individual manufacturer 16 or client may be based upon particular information subscribed to by manufacturer 16. For example, a particular manufacturer 16 may wish to receive only information regarding the purchase of the manufacturer's products and the purchase of the manufacturer's competitor's products. Thus, UPC server 12 may perform a filtering function in which only subscribed to data is transmitted to any particular manufacturer 16. Such filtering is described in greater detail below in conjunction with FIGS. 6A through 6E.

FIG. 6A is a block diagram illustrating additional details of one example of UPC server 12 showing units for receiving information, filtering that information, and distributing the filtered information to appropriate manufacturers 16. In the illustrated embodiment, UPC server 12 includes an input port 80 and an output port 82. Input port 80 represents circuitry and any associated software utilized to receive point-of-sale information from store 14 over communication link 24. Thus, although a limited number of stores 14 are illustrated in FIG. 1, input port 80 may be configured to receive point-of-sale information for all stores associated with UPC server 12. The point-of-sale information received by input port 80 is provided to filter 84. Filter 84 contains circuitry and/or software that identifies the type of point-of-sale information and associates that type of point-of-sale information with particular subscribing manufacturers 16. Such information is provided to an output port 82 for transmission to a particular manufacturer 16. By providing filtering capabilities, UPC server 12 alleviates a manufacturer 16 from having to process large amounts of information that is unrelated to the manufacturer's business.

Figure 6B:
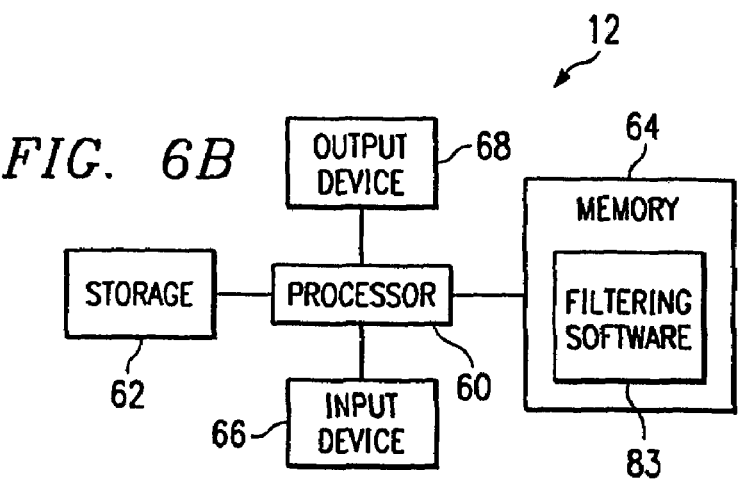
FIG. 6B is a block diagram of an alternative embodiment of the UPC server of FIG. 1 for use in the system of FIG. 1.

FIG. 6B is a block diagram illustrating one embodiment of a UPC server for filtering product purchase information from one or more retail stores 14 and providing information to clients such as manufacturers 16, vendors 20, and wholesalers 22. In this example, the filtering function of UPC server 12 is implemented using computer software stored in a memory accessible by a processor. UPC server 12—in FIG. 6B includes processor 60, a storage device 62 coupled to the processor 60, and a memory 64 coupled to the processor. Additionally, an input device 66 coupled to processor 60 and an output device 68 coupled to processor 60 are illustrated. These elements are analogous to respective elements of FIG. 4A having the same reference numeral. In this embodiment, memory 64 stores a filtering software 83 for providing selected product purchase information to a client, as described in greater detail below in conjunction with FIG. 6C.

Figure 6C:
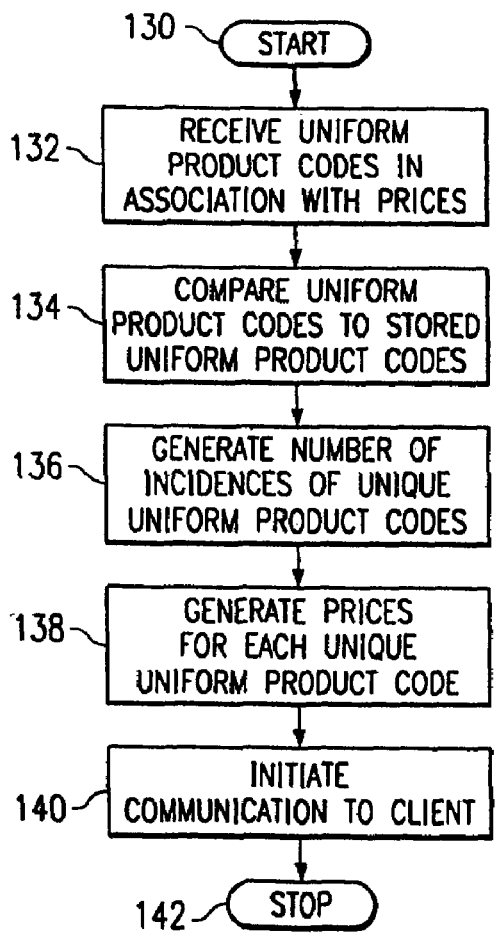
FIG. 6C is a flow chart illustrating a method for generating market data based on point-of-sale information received by the UPC server of FIG. 1.

FIG. 6C is a flow chart illustrating a method for generating market data based on point-of-sale information received by UPC server 12. The method begins at a step 130. At a step 132 Uniform Product Codes for products purchased from retail stores 14 are received by UPC server 12. In this embodiment, the prices of the purchase products are also received by UPC server 12 at step 1? At a step 134 the received Uniform Product Codes compared to Uniform Product Codes stored in UPC ser In one example, the stored Uniform Product Codes may be stored in memory 64 or storage device 62. The stored Uniform Product Codes represent products for which a particular client is interested in receiving product data. These products may include products competitive with products manufactured by the client, products manufactured by the client, products sold by the client, or other suitable products. At a step 136, the number of times a particular product having a UPC is received by server 112 is generated. Thus, the number of times a particular product is purchased over a given period of time may be determined. In this embodiment, the prices for each product associated with a unique Uniform Product Code are determined based upon the received information at step 132. At a step 138, the prices for each unique Uniform Product Code are generated. Over a suitable time period, at a step 140, the generated number of incidences of a particular product and the associated price is communicated to the client. The method concludes at step 142.

At a step 180, the received Uniform Product Code is stored in association with a customer identification for future use in examining the customer's purchasing history. For example, the customer's purchasing history may be used as a basis for generating an incentive to the customer.

Thus, a manufacturer, for example, may receive substantially real-time product purchase information for a manufacturer's products or products competitive with the manufacturer's products, which enables the manufacturer to respond rapidly to market conditions. Alternatively, filtering of product purchase information received from retail store 14 may occur directly at the manufacturer level by, either directly receiving product purchase information on a substantially real-time basis from retail store 14, or receiving product purchase information through UPC server 12 from which such filtered data may be determined according to the teachings of the invention.

Figure 6D:
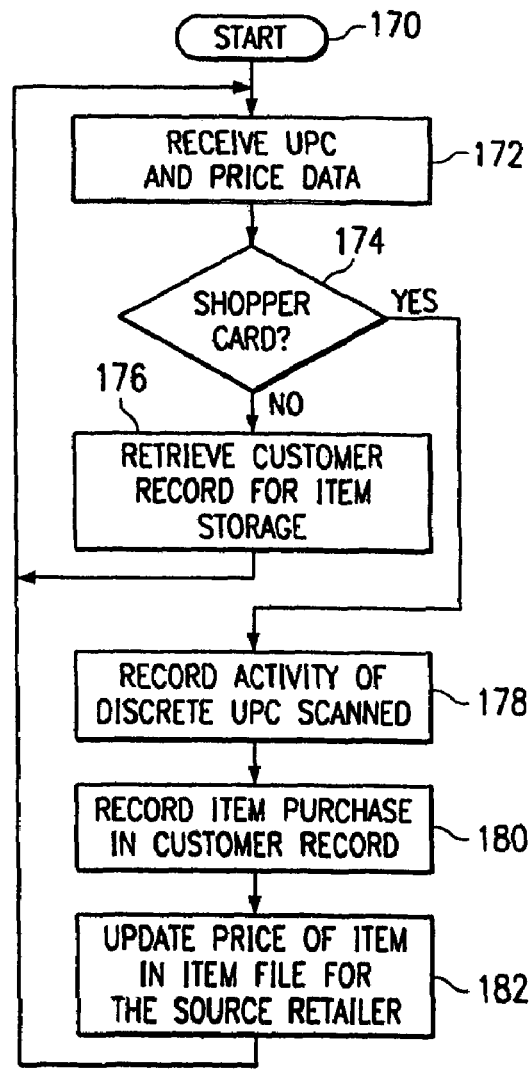
FIG. 6D is a flow chart illustrating an alternative method for generating market data based on point-of-sale information received by the UPC server of FIG. 1.

FIG. 6D is a flow chart illustrating an alternative method for generating market data based on point-of-sale information received by UPC server 12. The method begins at step 170. At a step 172 Uniform Product Codes for products purchased from retail stores 14 and the associated prices for the products are received by UPC server 12. At a step 174, a determination is made of whether the received Uniform Product Code is a Uniform Product Code identifying a particular customer. Uniform Product Codes may be imprinted on a customer identification card. If the Uniform Product Code received at step 172 is in fact an identifier of a particular customer, at a step 176 the customer's record of past purchases is retrieved from storage on UPC server 12. Once the customer's record is retrieved, step 172 continues with receiving a plurality of Uniform Product Codes and associated price data. After making the determination at step 174, UPC server 12 records and compiles a summary of the activity of individual Uniform Product Codes for presenting products by a plurality of customers at a step 178. Such recordation generates information useful by the manufacturer or seller of each particular product for use in marketing. At a step 180, individual purchases may be stored for each customer to further compile a history of any individual's past purchases. At a step 182, the price at which a particular product was purchased from a particular retail store is updated in storage in UPC server 12. The process repeats at step 182.

Thus, summary information related to the activity of products related to a client may be generated from the product purchase information received by UPC server 12. This summary information may be communicated to the client by electronic mail or by other methods.

FIG. 6E is a flow chart illustrating a method for a manufacturer to receive product purchase information and to effect changes in the market. The method begins at step 190. At a step 192, a client, such as manufacturer 16, accesses UPC server 12. Such access may be through accessing a web site associated with UPC server 12. At a step 194, UPC server retrieves parameter lists for a client indicating a Uniform Product Code list for filtering. Such list may include Uniform Product Codes associated with products for which the client is interested. Such products may include products competitive with the client's products and the client's products. At a step 196, the client may send additional filtering parameters such as time or date ranges, geographical regions, additional Uniform Product Code filtering criteria, or other suitable parameters. At a step 198, UPC server 12 accesses stored data relating to product purchases at retail stores 14 and provides, to the client, information specified by the filtering parameters provided by the client at steps 194 and 196. The information may be provided by an electronic mail message, by posting the information on a web site associated with UPC server 12, or by other suitable techniques: At a step 200, the client analyzes the data to determine if marketing action is needed. Such analysis may be performed, for example, by manufacturer computer 53. At a step 202, a decision is made by the client of whether action is needed. If action is needed, at a step 204 the client sends a response to UPC server 12 to effect remedial action. Such action may include a price change, an incentive communicated to kiosk 47, an incentive communicated to the point-of-sale, an electronic mail message including an incentive directed to a customer, or other suitable action. If no action is needed, the method concludes at step 206.

FIG. 7 is a flow chart illustrating the automatic response by a manufacturer 16 in response to the meeting of certain thresholds relating to the manufacturer's products. The process begins at step 85. At a step 86, information is received by manufacturer 16 as described above relating to a particular product. At a step 88, it is determined what criteria will be applied to assessing the position of the manufacturer's products. For example, the market share of the particular product may be the criteria used. As another example, the volume of sales of a particular product may be used as a criteria. As a third example, the relative pricing of the particular product in comparison to its competitor may be used as a criteria. Furthermore, changes in each of these criteria over a particular period of time may be used as a criteria. For simplicity of description, a market share criteria is adopted for the remainder of this example. A market share of 25% is considered desirable and a market share of less than 25% is considered undesirable.

At a step 90 a determination is made of whether the criteria level is exceeded. In this example, if the market share of the particular product manufactured by manufacturer 16 has a market share greater than 25%, a manufacturer 16 is satisfied and continues to receive information to remain abreast of the success of the manufacturer's product. If the market share is less than 25% then intercession is required at step 92, and manufacturer 16 utilizes one of many available options for attempting to increase the criteria level, which in this case is market share. By having the opportunity to receive information on a substantially real-time basis regarding product pricing and purchases, manufacturers 16 may intercede in a timely fashion in a manner not otherwise available. The above described functions may be performed by manufacturer computer 53 or, alternatively, UPC server 12 on behalf of manufacturer 16. It should be understood that wholesaler 22, vendor 20, and store 14 may also utilize such a method to address their desired marketing objectives.

According to another aspect of the invention, UPC server 12 operates to concentrate messages received from manufacturer 16 for delivery to customers of store 14. In order to effect the purchase of a manufacturer's product, manufacturer 16 may desire to provide incentives to customers of store 14, such as coupons or e-mails. According to one embodiment, UPC server 12 includes circuitry and/or software 70 that operates to concentrate promotional messages into a common e-mail so that customers of store 14 are not inundated with a plurality of undesired promotional e-mails. According to this embodiment, manufacturer 16 transmits a promotional e-mail to UPC server 12 for receipt by a particular customer or to customers who meet a particular criteria, such as, for example, customers who purchase a particular product or group of products, number of products, dollar amount of products, or other criteria. Manufacturer 16 identifies the customer of store 14 by some sort of identification number. UPC server 12 also receives a plurality of other promotional messages for receipt by the same customer of store 14, but from different manufacturers 16. UPC server 16 consolidates these e-mails into a common e-mail that is sent to an e-mail address known by UPC server 12 but not by manufacturers 16. This process helps maintain the privacy of the customer of store 14 and also reduces the number of e-mails received by the customer.

Figure 8A:
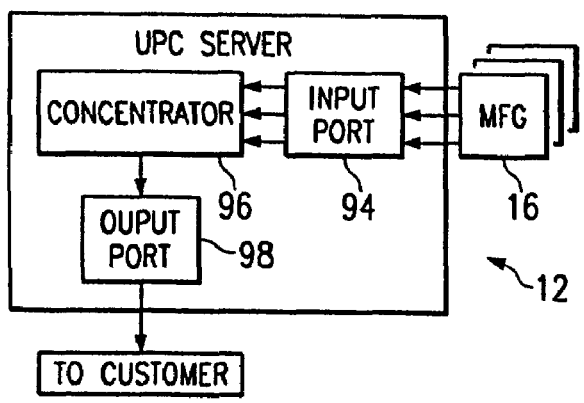
FIG. 8A is a block diagram of an example UPC server containing circuitry and/or software operable to concentrate e-mails provided by a plurality of manufacturers for receipt by a customer of a store.

FIG. 8A is a block diagram of an example UPC server 12 containing circuitry and/or software operable to concentrate e-mails provided by a plurality of manufacturers 16 for receipt by a customer of a store 14. In this embodiment, UPC server 12 includes an input port system 94 for receiving a plurality of e-mails from a plurality of manufacturers 16. These e-mails are provided to a concentrator system 96. Concentrator system 96 consolidates a plurality of e-mails destined for a common user into a common e-mail message. The e-mails may have been originally directed to a particular customer by manufacturers 16 by, for example, use of a customer identification number. Alternatively, manufacturers 16 may provide an e-mail including an incentive in combination with criteria, either in the e-mail or otherwise communicated, for whom receipt of the e-mail is intended. Such criteria may include the purchase or non-purchase of a particular product or group of products, volume of purchase, dollar amount of purchases, or other suitable criteria. In response, concentration system 96 determines the particular customers who should receive the e-mail based on the specified criteria. This common e-mail message is provided to output port system 98, which in turn transmits the common e-mail to a customer of store 14. Such transmission may be effected on a periodic basis, such as daily, or other suitable time period. This e-mail message may be transmitted to customer computer 18. Alternatively, data relative to the concentrated group of incentives, may be transmitted to a customer at the point-of-sale, such as to a customer receipt, to the customer at kiosk 47, or to any other suitable location. In this manner, UPC server 12 also operates to facilitate transmission of promotional messages to the customer, in addition to providing a means of communication of point-of-sale data to a manufacturer on a substantially real-time basis. The UPC server 12 of FIG. 8A may be implemented using a combination of hardware and software similar to that illustrated in FIGS. 4A and 6B.

Figure 8B:
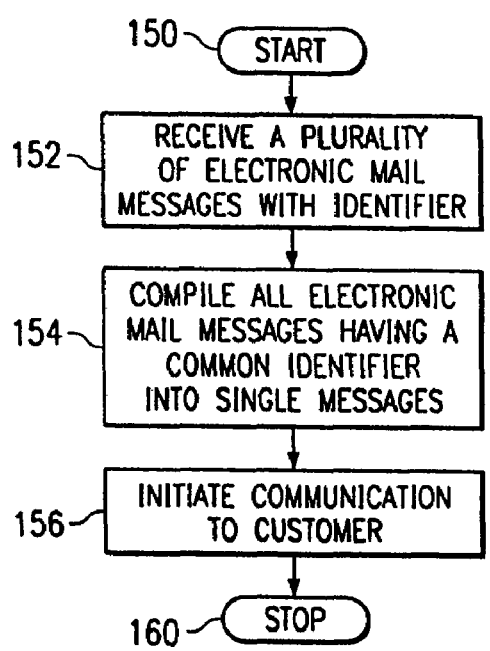
FIG. 8B is a flow chart illustrating example portions of a method for compiling a plurality of incentives into a single incentive for communication to a customer.

FIG. 8B is a flow chart illustrating a method for concentrating a plurality of incentives into a common message for receipt by a customer. The method begins at step 150. At a step 152 a plurality of incentives are received at UPC server 12. In this embodiment, a plurality of electronic mail messages are received with an identifier indicating a particular customer for whom receipt of the respective incentive is intended. The identification may be an identification number that may be matched to the customer only by UPC server 12; however, other suitable identification numbers may be used. At a step 154 all electronic mail messages having a common identifier are compiled into a single document. At a step 156

UPC server 12 initiates communication of the single document to each respective customer. Communication to the customer of the single document may include transmitting an electronic mail message to customer computer 18 or transmitting data to the customer at the point-of-sale, including printing a message on a customer receipt at the point-of-sale. The method concludes at step 160.

The plurality of incentives may be received by UPC server 12 from manufacturers 16, vendors 20, wholesalers 22, retailers 14, or other suitable party. The incentives may be generated according to any of the plurality of techniques described above, or other suitable techniques. For example, a customer may provide a shopping list to UPC server 12 and in response at least one item on the shopping list is transmitted to, for example, manufacturer 16. In response, manufacturer 16 generates an incentive for receipt by the customer. The incentive may provide a discount on the item, a discount on a item competitive with the item, or other suitable discounts.

In this manner, a customer may receive a plurality of incentives without being inundated with a voluminous number of messages. Furthermore, if desired, such incentives may be made on an anonymous basis by use of customer identifiers known only to UPC server 12.

Figure 8C:
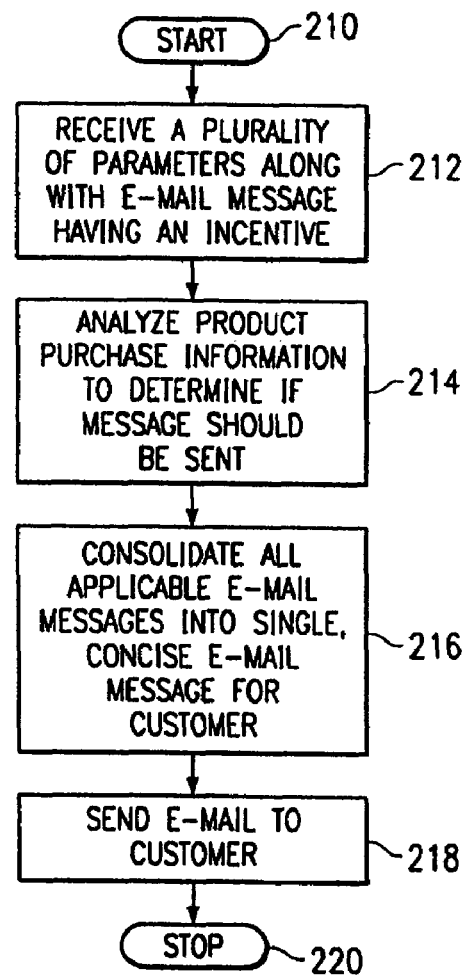
FIG. 8C is a flow chart illustrating the generation of a consolidated e-mail containing a plurality of incentives based upon criteria specified by a manufacturer.

FIG. 8C is a flow chart illustrating an alternative embodiment for concentrating a plurality of incentives into a common message for receipt by a customer. The method begins at a step 210. At a step 212, UPC server 12 receives a plurality of parameters along with one or more electronic mail messages associated with the parameters. The parameters are provided by clients, such as manufacturers 16, vendors 20, or wholesalers 22. The parameters may specify, as described above, criteria from which a determination may be made whether a particular incentive contained in an e-mail is directed to a customer. For example, the parameters may include the purchase of a particular product, the purchase of a group of products, the nonpurchase of a particular product or group of products, a customer meeting a predetermined purchasing history criteria, such as volume of purchases, or dollar amount of purchases. The parameters may also include additional suitable criteria, such as the criteria specified in U.S. Pat. No. 5,687,322 to Deaton, et al.

At a step 214, UPC server 12 analyzes the product purchase information received from a plurality of stores 14 over communication link 24 to determine whether an e-mail message should be sent to a particular customer based upon the parameters received at step 212. At a step 216, all applicable electronic mail messages destined for a particular customer are consolidated into a single concise document for communication to the customer. The incentives included in the consolidated document may be include incentives that were directed specifically to the particular customers as well as the incentives determined at step 214 from the parameters at step 212. At a step 218, an electronic mail message is sent to customer computer 18. Alternatively, the electronic mail message may be converted into data of suitable form that may transmitted to the customer at other locations. For example, data relative to the incentives included in the consolidated electronic mail message may be communicated to the customer at the point-of-sale by printing the incentives on a customer receipt or by communicating the incentives to kiosk 47. Other suitable forms of communication of the consolidated electronic mail message may also be used. The method concludes at step 220.

Figure 9:
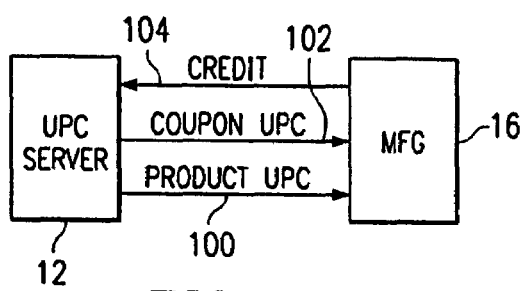
FIG. 9 is a block diagram illustrating the use of a UPC server in facilitating coupon redemption validation and electronic crediting.

According to another aspect of the invention, UPC server includes circuitry and/or software for facilitating both coupon redemption validation and electronic settlement mechanisms for incentives offered by the manufacturer, as illustrated in FIG. 9.

FIG. 9 is a block diagram illustrating the use of UPC server in facilitating coupon redemption validation and electronic crediting. Bar codes scanned from a product may be provided to manufacturer 16 by UPC server 12 as indicated by arrow 100. Traditionally, coupons are marked with a Uniform Product Code and thus, bar codes scanned from a coupon may also be provided to manufacturer 16 by UPC server 12 as indicated by arrow 102. Thus, manufacturer 16 is able to receive both the product Uniform Product Code and the Uniform Product Code associated with a coupon for that product. Therefore, the manufacturer may verify the proper redemption of a manufacturer coupon and provide an appropriate credit to store 14. Such redemption verification includes verifying that the product associated with the coupon is actually purchased. Verification may also include verifying the price at which the product was purchased. In addition, for incentives associated with a particular customer, the identity of the person receiving a discount may be verified. Manufacturer computer 53 may be used to perform these functions. Alternatively, UPC server 12 may include circuitry and/or software 70 for also performing this validation and for providing manufacturer 16 a summary of the number and amount of coupons redeemed for the particular manufacturer. In either event, once verified manufacturer 16 may effect a credit, demonstrated by arrow 104, directed to store 14 in the amount of the redeemed coupons. The credit may be communicated to store 14 through UPC server 12 or directly to store 14. Such communication may utilize an electronic mail message or other suitable mechanism. Because product information may be received on a substantially real-time basis, coupon redemption validation may also be performed rapidly.

Figure 10:
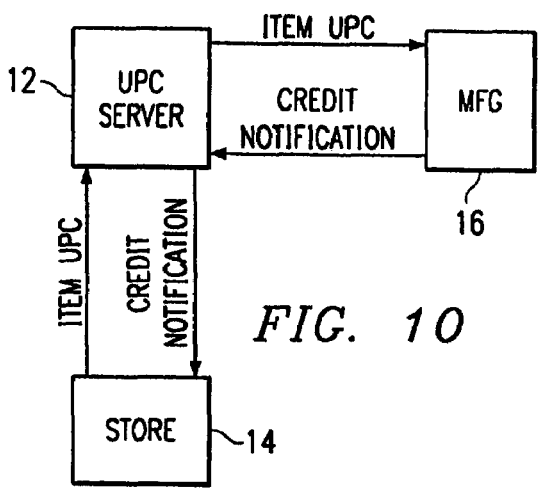
FIG. 10 is a block diagram showing an additional embodiment of the invention in which a UPC server facilitates electronic settlement of credit and debits between a store and a manufacturer.

FIG. 10 is a block diagram showing an additional embodiment of the invention in which UPC server 12 facilitates electronic settlement of credit and debits between store 14 and manufacturer 16. According to one aspect of the invention, manufacturer 16 may respond in a substantially real-time basis to market developments to attempt to adjust the relative market share of a manufacturer's product, or attempt to adjust to other market conditions to attempt to generate desirable product sales of the manufacturer's products.

One adjustment made by manufacturer 16 is the downward adjustment of price at which the manufacturer's product will be sold. Manufacturer 16 may effect such a downward adjustment in price by specifying to store 14 the price at which the store should sell the product and by granting a credit to the store 14 for each such product purchased. Such a method for adjusting to market conditions may require a settlement mechanism between manufacturer 16 and store 14 to account for the lower price offered by store 14 at the request of manufacturer 16. UPC server 12 therefore, may receive from store 14 Uniform Product Codes and the price information that is also transmitted to manufacturer 16. Manufacturer 16 may then be able to assess the number of its products sold at a discount and the amount of discount owed store 14. In response, manufacturer 16 may provide a credit notification through UPC server 12 for transmission to store 14, thus effecting electronic settlement of temporary price reductions offered by a manufacturer and implemented by a store. Such electronic settlement may also be utilized to compensate store 14 for redeemed coupons or application of other discounts effected at the initiative of manufacturer 16.

It should be understood that, in some embodiments, the above-described reconciliation process may be implemented through direct coupling of store 14 to manufacturer 16 without the use of UPC server 12 as an intermediary.

Figure 11:
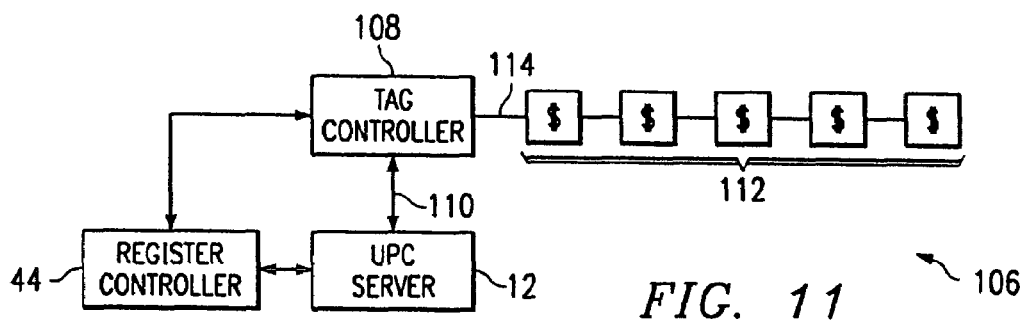
FIG. 11 is a block diagram of a system for remotely effecting a product price change in a retail store.

FIG. 11 is a block diagram of a system 106 for remotely effecting a product price change in a retail store. System 106 includes a tag controller 108 connected to a plurality of electronic tags 112 via a communication link 114. According to one embodiment, communication link 114 comprises an FM transmitter for transmitting to electronic tags 112 the price to be displayed on each individual electronic tag 112. According to another embodiment, communication link 114 comprises a suitable conductive transmission medium, such as electrical wires. The system also includes a UPC server 12 connected to tag controller 110 via a communication link 110. According to one embodiment, tag controller 108 is located in a store, such as store 14, that is connected to UPC server 12. According to the same embodiment, communication link 110 utilizes the Internet. Communication link 110 allows UPC server 12 to provide an updated price for an item, such as the manufacturer's product, in response to the determination by the manufacturer based on substantially real-time data that it would be desirable to effect a change in price of the manufacturer's product. UPC server 12 communicates a signal indicating such a change to tag controller 108. Tag controller then provides such a signal along communication link 114 to a particular electronic tag 112 associated with the manufacturer product. Electronic tags 112, may be positioned, on a shelf near the location of the product. UPC server 12 may also communicate the price change to store 14 so that store 14 may maintain for its own records the adjusted price and verify any credits provided by manufacturer 16.

Therefore, manufacturer 16 may remotely effect a price change in one of its products in response to the analysis of data regarding the sale of its products or its competitors products. In addition, tag controller 108 may also provide price information to UPC server 12 so that the price information received from points of sale 36, 38 and 40 may be verified against the prices displayed by the electronic tags 112 in store 14. Further, UPC server 12 may communicate the price changes to register controller 46 to maintain consistency between electronic tags 112 and register controller 46. Alternatively, register controller 44 may communicate directly with register controller 44, with register controller 44 providing the price change to tag controller 108.

In addition to providing product purchase and price information at the point-of-sale to the manufacturer, UPC server 12 also allows access to customers of product purchase and pricing information.

Figure 12:
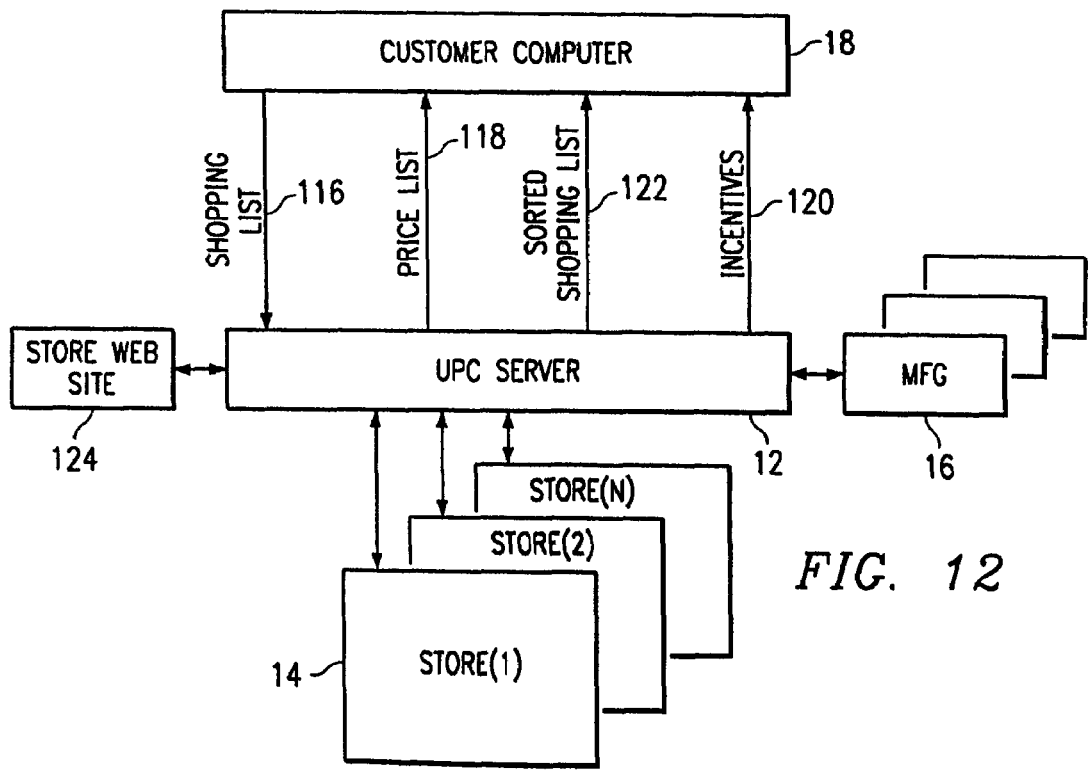
FIG. 12 illustrates a block diagram of a portion of the system of FIG. 1, showing the exchange of communication between a customer computer and a UPC server.

FIG. 12 illustrates a block diagram of a portion of system 10, showing the exchange of communication between customer computer 18 and UPC server 12. In this example, a user of customer computer 18 submits a shopping list to UPC server 12, as designated by arrow 116. In response, UPC server 12 submits a price list having the price of each item at each store 14 at which the user might shop, as designated by arrow 118. Therefore, by accessing UPC server 12, customers may determine at which store to shop for all items or for particular items. As an example, a customer selects one or more stores to price items and enters items to be priced. The customer's purchase history is used to aid the customer in selecting items for pricing. As items are presented for pricing, deals can optionally be presented to the customer that are based on items being priced. For example, Brand A paper towels is presented in the customer's list for pricing, so a deal that is stored for Brand B paper towels is presented to the customer. The prices for the customer's items are accessed from each store's item list and presented to the customer in total. One or more of the stores may have discount rates stored based on a customer's spending level. For example, the customer spends an average of $135.00 per week at Store A, and Store A has stored in its pricing table that any customer spending on average $75.00 or more per week would be presented with an incentive of 5% on purchases totaling $50.00 to $75.00 and 8% on purchase totals that exceed $75.00. This discount would be factored in and presented to the customer. The customer would then print out the shopping list stored by retail aisle for that particular store to facilitate shopping efficiency. Alternatively, the list could be processed for home delivery.

Further, discounts may be electronically stored on UPC server 12 or a web site 124 associated with store 14 for subsequent access by the customer. The electronic discounts may also communicate to store 14 for application when the customer is identified purchasing the product associated with the discount. Alternatively, the electronic discounts may be made available to customer in a printed format by allowing customer computer to download a redeemable coupon stored on either a store web site 124 or UPC server 12. The customer may then print the redeemable coupon on a printer associated with customer computer 18. Such a coupon may include a unique identification number that is available at store 14 to prevent unlawful duplication of redeemable coupons. Once a coupon having a unique identification number is redeemed, no other coupons having that same number will be redeemed. Alternatively, a manufacturer may communicate product discounts to store web site 124, through UPC server 12, for viewing by customers.

Furthermore, when shopping list 116 is submitted, UPC server may offer to one or more manufacturers 16 the opportunity to provide incentives to the particular customer submitting a shopping list. For example, manufacturer 16 may wish to offer incentives to such a customer, the content of the incentive being directed to the manufacturer's competing product for a product submitted in the shopping list. The providing of such incentives is illustrated by arrow 120.

Additional types of incentives, such as those described above, may also be utilized, including incentives associated with the price at which a particular item or an item competitive with a particular item was purchased at a give store 14 or any store 14 during a predetermined time period prior to receipt of the shopping list. Therefore, for example, a customer may be induced to loyalty to a particular brand if the customer knows the manufacturer will always match or beat the price of particular products competitive with products of a particular brand. Furthermore, a customer may be induced to loyalty to a particular store if the customer knows the retail store 14 will match or beat the prices offered by the other stores 14 on the products purchased by the customer. In addition, UPC server 12 may communicate a sorted shopping list, which may or may not include customer incentives, that is configured according to the placement of the various items in a particular store 14, as designated by arrow 122. Thus, the customer may receive an e-mail displaying a map of the aisles of the store with the products provided by the customer in the shopping list at 116 indicated in a location corresponding to the actual location of the particular product in the store 14. Therefore, a particular customer may be more likely to visit a store in which a shopping list is provided showing the particular location of each item the customer desires. For example, a shopper may actually be a spouse or friend of the underlying purchaser, and may not typically frequent a particular store. Therefore, having a list identifying the particular location at which each particular item is offered for sale may induce a customer to use the services of a particular store rather than a different store.

Although the present invention and its advantages have been described in detail, it should be understood that various changes, substitutions, and alternatives can be made therein without departing from the spirit and scope of the present invention as defined by the appended claims. For example, an embodiment of the invention has been described in the context of utilizing UPC codes; however, it is explicitly contemplated that the teachings of the invention may be incorporated with other types of codes representative of products, including existing codes and codes yet to be developed.

What is claimed is:

1. A method for use in marketing, comprising:
   detecting, at a remote computer, product purchase information of a plurality of different retailers from points-of-sale associated with the respective retailers, the product purchase information including at least a purchase price at which at least one item was purchased, the remote computer located remote from the retailers;
   receiving, at the remote computer, a shopping list of a customer, the shopping list including at least one desired item;
   correlating, at the remote computer, the product purchase information and the purchase price with the at least one desired item; and
   in response to receiving the shopping list, initiating communication to the customer via the remote computer the correlated information including at least the shopping list, the product purchase information, and the purchase price.

2. The method of claim 1, wherein initiating communication comprises transmitting an electronic mail message for receipt by the customer.

3. The method of claim 1, wherein detecting, at a remote computer, product purchase information of a plurality of retailers, comprises detecting product purchase information of a plurality of retailers on a substantially real-time basis.

4. The method of claim 1, wherein receiving a shopping list of a customer comprises receiving an electronic mail message including the at least one desired item.

5. The method of claim 1, wherein receiving a shopping list of a customer comprises receiving information from the customer over the Internet.

6. The method of claim 5, wherein receiving information from the customer over the Internet comprises receiving information inputted into a web page associated with the remote computer.

7. The method of claim 1, and further comprising storing product purchase information from the plurality of retailers in association with customer identification numbers.

8. The method of claim 7, and further comprising transmitting to the customer a proposed shopping list prior to receiving the shopping list including at least one desired item.

9. The method of claim 8, wherein the proposed shopping list comprises products previously purchased by the customer.

10. The method of claim 8, wherein the proposed shopping list comprises products previously purchased by the customer in the customer's most recent shopping transaction with one of the plurality of retailers.

11. The method of claim 1, and further comprising initiating, by the remote computer, communication of an incentive associated with the at least one desired item to the customer in response to receiving the shopping list.

12. The method of claim 11, wherein the incentive comprises a discount on the at least one desired item.

13. The method of claim 11, wherein the incentive comprises a discount on a product competitive with the at least one desired item.

14. The method of claim 13, and further comprises comparing, by the computer, the price of the at least one desired item at a first retailer of the plurality of retailers to the price of the competitive item at the first retailer, the price of the at least one desired item and the competitive item at the first retailer determined from the product purchase information, and wherein the incentive comprises a discount sufficient to lower the effective price on the competitive item to match or beat the price of the at least one desired item.

15. The method of claim 13, wherein the price of the competitive item comprises the purchase price at which the competitive item was purchased within an hour of the receipt of the shopping list.

16. The method of claim 11, and further comprising comparing, by the computer, the price of the at least one desired item at a first retailer of the plurality of retailers to the lowest purchase price at which the at least one desired item was purchased from the first retailer within a predetermine time period, the lowest purchase price determined from the product purchase information, and wherein the incentive comprises a discount sufficient to lower the effective price at the first retailer on the at least one desired item to match or beat the lowest purchase price.

17. The method of claim 16, wherein the predetermined time period is approximately one hour from the receipt of the shopping list.

18. The method of claim 11, wherein the incentive comprises a redeemable coupon.

19. The method of claim 11, wherein the incentive comprises a notification of a future electronic discount.

20. The method of claim 11, wherein the incentive comprises a redeemable coupon on a product determined to be a product more frequently purchased by the customer than other products purchased by the customer.

21. A remote computer comprising:
   a processor;
   a memory accessible by the processor; and
   a computer program stored in the memory, the computer program operable to be executed on the processor and further operable to:
      detect product purchase information of a plurality of different retailers from points-of-sale associated with the respective retailers located remotely from the remote computer, the product purchase information including at least a purchase price at which at least one item was purchased;
      receive a shopping list of a customer, the shopping list including at least one desired item;
      correlate the product purchase information and the purchase price with the at least one desired item; and
      in response to receiving the shopping list, initiate communication to the customer via the remote computer the correlated information including at least the shopping list, the product purchase information, and the purchase price.

22. An article comprising a medium for storing instructions that enable a remote computer to:
   detect product purchase information of a plurality of different retailers from points-of-sale associated with the respective retailers located remotely from the remote computer, the product purchase information including at least a purchase price at which at least one item was purchased;
   receive a shopping list of a customer, the shopping list including at least one desired item;
   correlate the product purchase information and the purchase price with the at least one desired item; and
   in response to receiving the shopping list, communicate to the customer via the remote computer the correlated information including at least the shopping list, the product purchase information, and the purchase price.

* * * * *